US012781017B2

(12) United States Patent
Sievers et al.

(10) Patent No.: US 12,781,017 B2
(45) Date of Patent: Nov. 3, 2026

(54) MECHANOCATALYTIC OXIDATIVE DEPOLYMERIZATION OF PLASTICS

(71) Applicant: Georgia Tech Research Corporation, Atlanta, GA (US)

(72) Inventors: Carsten Sievers, Atlanta, GA (US); Yuchen Chang, Atlanta, GA (US); Van Son Nguyen, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 643 days.

(21) Appl. No.: 18/228,750

(22) Filed: Aug. 1, 2023

(65) Prior Publication Data

US 2024/0309166 A1 Sep. 19, 2024

Related U.S. Application Data

(60) Provisional application No. 63/370,295, filed on Aug. 3, 2022.

(51) Int. Cl.
*C08J 11/16* (2006.01)
*C08J 11/06* (2006.01)
*C08J 11/14* (2006.01)

(52) U.S. Cl.
CPC ................ *C08J 11/16* (2013.01); *C08J 11/06* (2013.01); *C08J 11/14* (2013.01); *C08J 2323/30* (2013.01)

(58) Field of Classification Search
USPC ............................................................ 521/47
See application file for complete search history.

(56) References Cited

FOREIGN PATENT DOCUMENTS

| | | | | |
|---|---|---|---|---|
| JP | 2009191174 A * | 8/2009 | | |
| JP | WO2019203051 A1 * | 5/2021 | .............. | B09B 3/70 |

OTHER PUBLICATIONS

JP-WO2019203051-A1 Machine Translation (Year: 2021).*
JP-2009191174-A Machine Translation (Year: 2009).*

* cited by examiner

*Primary Examiner* — Terressa Boykin
(74) *Attorney, Agent, or Firm* — TROUTMAN PEPPER LOCKE LLP; Ryan A. Schneider; Stephanie J. Remy

(57) ABSTRACT

An exemplary embodiment of the present disclosure provides a method for depolymerizing a polymer product. The method comprises forming a reaction mixture by combining polymer feedstock with an activating agent and producing an oxidized polymer comprising one or more functional groups comprising an oxygen atom. Also described are systems comprising a vessel having one or more inert or chemically reactive grinding bodies, polymer feedstock, and an activating agent, wherein the system is configured to mix the one or more grinding bodies, the polymer feedstock, and activating agent under approximately ambient pressure.

17 Claims, 27 Drawing Sheets

MECHANOCATALYTIC OXIDATIVE DEPOLYMERIZATION OF PLASTICS

CROSS-REFERENCE TO RELATED APPLICATIONS

This application claims the benefit of U.S. Provisional Application Ser. No. 63/370,295, filed on 3 Aug. 2022, which is incorporated herein by reference in its entirety as if fully set forth below.

FEDERALLY SPONSORED RESEARCH STATEMENT

This disclosure was made with government support under grant/award number DESC0016486, awarded by the Department of Energy. The government has certain rights in the disclosure.

FIELD OF THE DISCLOSURE

The various embodiments of the present disclosure relate generally to systems and methods to recycle polymers, and more particularly to depolymerization of polymers by mechanical forces under ambient conditions.

BACKGROUND

Global production of synthetic plastics has increased continuously since the early 20th century from 2 million tons in 1950 to 459 million tons in 2019. Among all plastics produced, polyethylene (PE) has the highest proportion on the global market, accounting for approximately 28.5% of total plastic production. Currently, high density polyethylene (HDPE) is recyclable to a limited extent, while low density polyethylene (LDPE) remains unrecyclable. While PE can be converted by catalytic or thermal pyrolysis and gasification, these processes are energy intensive and yield low value products. Other approaches to chemical recycling require the dissolution of PE in toxic organic solvents, the use of expensive catalysts and/or the use of high temperature and pressure, which limits industrial applicability.

Chemical recycling of PE faces several challenges, including the high ceiling temperature (i.e., 883 K), the intrinsic inertness of the PE backbone, and its resistance to abrasion and impacts. Therefore, there is a need for recycling processes that combine depolymerization/cracking with other reactions (e.g., hydrogenation, oxidation, aromatization of intermediates) to create a thermodynamic driving force and promote subsequent chain cleavage and depolymerization.

BRIEF SUMMARY

The present disclosure relates to systems and methods for the depolymerization of polymers by mechanical forces under ambient conditions. An exemplary embodiment of the present disclosure includes forming a reaction mixture by combining polymer feedstock with an activating agent and producing an oxidized polymer comprising one or more functional groups comprising an oxygen atom.

In any of the embodiments disclosed herein, the activating agent can include a reaction product of a catalyst and an oxidizing agent.

In any of the embodiments disclosed herein, the oxidizing agent can include at least one of hydrogen peroxide, water, oxygen, hydroxide, ozone, organic peroxides, or combinations thereof.

In any of the embodiments disclosed herein, the catalyst can include iron oxide, titanium dioxide, zirconium dioxide, ruthenium oxide, manganese oxide, cerium oxide, molybdenum oxide, vanadium oxide, nickel oxide, cobalt oxide, tungsten carbide, and combinations thereof.

In any of the embodiments disclosed herein, the method can further include agitating the reaction mixture with one or more grinding bodies to produce a mixture of at least one depolymerized polymer.

In any of the embodiments disclosed herein, the grinding bodies can include balls, rods, or hammers comprising inert or chemically reactive materials.

In any of the embodiments disclosed herein, the method can further include moving the oxidized polymer through an inert or chemically reactive die to produce a mixture of at least one depolymerized polymer.

In any of the embodiments disclosed herein, the polymer feedstock can include a molecular weight equal to or greater than 500 grams per mol (g/mol). The one or more depolymerized polymer can include a molecular weight equal to or less than 499 g/mol.

In any of the embodiments disclosed herein, the polymer feedstock can include one or more polyolefins.

In any of the embodiments disclosed herein, the method can further include agitating the oxidized polymer under approximately ambient pressure.

In any of the embodiments disclosed herein, the method can further include agitating the oxidized polymer under approximately ambient temperature.

In any of the embodiments disclosed herein, the method can further include collecting the at least one depolymerized polymer and removing by-products.

An exemplary embodiment of the present disclosure includes a method for depolymerizing a polymer product. The method can include the steps of oxidizing a polymer feedstock with a reaction product of a catalyst and an oxidizing agent to form an oxidized polymer comprising one or more functional groups comprising an oxygen atom: milling the oxidized polymer with grinding bodies; and producing one or more depolymerized polymers comprising a molecular weight smaller than the polymer feedstock.

In any of the embodiments disclosed herein, the catalyst can include iron oxide, titanium dioxide, zirconium dioxide, ruthenium oxide, manganese oxide, cerium oxide, molybdenum oxide, vanadium oxide, nickel oxide, cobalt oxide, tungsten carbide, or combinations thereof.

In any of the embodiments disclosed herein, the oxidizing agent can include hydrogen peroxide, water, oxygen, hydroxide, ozone, or combinations thereof.

In any of the embodiments disclosed herein, the polymer product can include a polyolefin.

In any of the embodiments disclosed herein, the oxidizing, milling, and producing steps can take place in a vessel.

An exemplary embodiment of the present disclosure provides a system for depolymerizing a polymer product. The system can include a vessel comprising one or more inert or chemically reactive grinding bodies, polymer feedstock, and an activating agent. The system can be configured to mix the one or more grinding bodies, the polymer feedstock, and activating agent under approximately ambient pressure.

In any of the embodiments disclosed herein, the vessel can include an outlet to remove one or more depolymerized polymers or by-products.

In any of the embodiments disclosed herein, the vessel can include an inlet for introducing the polymer feedstock, a catalyst, an oxidizing agent, or combinations thereof.

These and other aspects of the present disclosure are described in the Detailed Description below and the accompanying drawings. Other aspects and features of embodiments will become apparent to those of ordinary skill in the art upon reviewing the following description of specific, exemplary embodiments in concert with the drawings. While features of the present disclosure may be discussed relative to certain embodiments and figures, all embodiments of the present disclosure can include one or more of the features discussed herein. Further, while one or more embodiments may be discussed as having certain advantageous features, one or more of such features may also be used with the various embodiments discussed herein. In similar fashion, while exemplary embodiments may be discussed below as device, system, or method embodiments, it is to be understood that such exemplary embodiments can be implemented in various devices, systems, and methods of the present disclosure.

BRIEF DESCRIPTION OF THE DRAWINGS

The following detailed description of specific embodiments of the disclosure will be better understood when read in conjunction with the appended drawings. For the purpose of illustrating the disclosure, specific embodiments are shown in the drawings. It should be understood, however, that the disclosure is not limited to the precise arrangements and instrumentalities of the embodiments shown in the drawings.

DETAILED DESCRIPTION

Figure 1A:
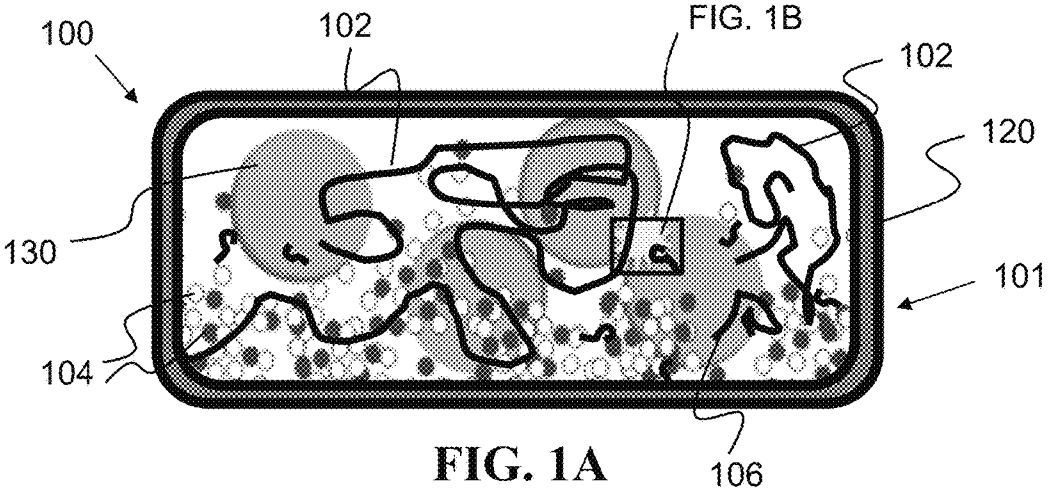
FIG. 1A provides a schematic of an example system for mechanocatalytic oxidative cracking of polymer feedstocks, in accordance with an exemplary embodiment of the present disclosure.

To facilitate an understanding of the principles and features of the present disclosure, various illustrative embodiments are explained below. The components, steps, and materials described hereinafter as making up various elements of the embodiments disclosed herein are intended to be illustrative and not restrictive. Many suitable components, steps, and materials that would perform the same or similar functions as the components, steps, and materials described herein are intended to be embraced within the scope of the disclosure. Such other components, steps, and materials not described herein can include, but are not limited to, similar components or steps that are developed after development of the embodiments disclosed herein.

It must be noted that, as used in the specification and the appended claims, the singular forms "a," "an" and "the" include plural references unless the context clearly dictates otherwise. For example, reference to a component is intended also to include composition of a plurality of components. References to a composition containing "a" constituent is intended to include other constituents in addition to the one named. In other words, the terms a, an, and the do not denote a limitation of quantity, but rather denote the presence of at least one of the referenced item.

As used herein, the term "and/or" may mean "and," it may mean "or," it may mean exclusive "or," it may mean "one," it may mean "some, but not all," it may mean "neither," and/or it may mean "both." The term "or" is intended to mean an inclusive "or."

Also, in describing the exemplary embodiments, terminology will be resorted to for the sake of clarity. It is intended that each term contemplates its broadest meaning as understood by those skilled in the art and includes all technical equivalents which operate in a similar manner to accomplish a similar purpose. It is to be understood that embodiments of the disclosed technology may be practiced without these specific details. In other instances, well-known methods, structures, and techniques have not been shown in detail in order not to obscure an understanding of this description. References to "one embodiment," "an embodiment," "example embodiment," "some embodiments," "certain embodiments," "various embodiments," etc., indicate that the embodiment(s) of the disclosed technology so described may include a particular feature, structure, or characteristic, but not every embodiment necessarily includes the particular feature, structure, or characteristic. Further, repeated use of the phrase "in one embodiment" does not necessarily refer to the same embodiment, although it may.

Ranges may be expressed herein as from "about" or "approximately" or "substantially" one particular value and/or to "about" or "approximately" or "substantially" another particular value. When such a range is expressed, other exemplary embodiments include from the one particular value and/or to the other particular value. Further, the term "about" means within an acceptable error range for the particular value as determined by one of ordinary skill in the art, which will depend in part on how the value is measured or determined, i.e., the limitations of the measurement system. For example, "about" can mean within an acceptable standard deviation, per the practice in the art. Alternatively, "about" can mean a range of up to ±20%, preferably up to ±10%, more preferably up to ±5%, and more preferably still up to ±1% of a given value. Alternatively, particularly with respect to biological systems or processes, the term can mean within an order of magnitude, preferably within 2-fold, of a value. Where particular values are described in the application and claims, unless otherwise stated, the term "about" is implicit and in this context means within an acceptable error range for the particular value.

In addition, throughout this disclosure, various aspects of the disclosure can be presented in a range format. It should be understood that the description in range format is merely for convenience and brevity and should not be construed as an inflexible limitation on the scope of the disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Similarly, as used herein, "substantially free" of something, or "substantially pure", and like characterizations, can include both being "at least substantially free" of something, or "at least substantially pure", and being "completely free" of something, or "completely pure."

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

The term "aliphatic" or "aliphatic group," as used herein, means a straight-chain (i.e., unbranched) or branched, substituted or unsubstituted hydrocarbon chain that is completely saturated or that contains one or more units of unsaturation, or a monocyclic hydrocarbon or bicyclic hydrocarbon that is completely saturated or that contains one or more units of unsaturation, but which is not aromatic (also referred to herein as "carbocycle" or "cycloaliphatic"), that has a single point of attachment to the rest of the molecule. Unless otherwise specified, aliphatic groups contain 1-6 aliphatic carbon atoms. In some embodiments, aliphatic groups contain 1-5 aliphatic carbon atoms. In other embodiments, aliphatic groups contain 1-4 aliphatic carbon atoms. In still other embodiments, aliphatic groups contain 1-3 aliphatic carbon atoms, and in yet other embodiments, aliphatic groups contain 1-2 aliphatic carbon atoms. Suitable aliphatic groups include, but are not limited to, linear or branched, substituted or unsubstituted alkyl, alkenyl, alkynyl groups and hybrids thereof such as cycloalkyl, (cycloalkyl)alkyl, (cycloalkenyl)alkyl or (cycloalkyl)alkenyl.

The term "alkyl," unless otherwise indicated, as used herein, refers to a monovalent aliphatic hydrocarbon radical having a straight chain, branched chain, monocyclic moiety, or polycyclic moiety or combinations thereof, wherein the radical is optionally substituted at one or more carbons of the straight chain, branched chain, monocyclic moiety, or polycyclic moiety or combinations thereof with one or more substituents at each carbon, wherein the one or more substituents are independently $C_1$-$C_{10}$ alkyl. In some embodiments, "cycloalkyl" (or "carbocycle") refers to a monocyclic $C_3$-$C_6$ hydrocarbon that is completely saturated or that contains one or more units of unsaturation, but which is not aromatic, that has a single point of attachment to the rest of the molecule. A carbocycle can be, under certain circumstances, a bridged bicyclic or a fused ring such as, e.g., an ortho-fused carbocycle, a spirofused carbocycle, etc. Examples of "alkyl" groups include, but are not limited to, methyl, ethyl, propyl, isopropyl, butyl, iso-butyl, sec-butyl, tert-butyl, pentyl, hexyl, heptyl, cyclopropyl, cyclobutyl, cyclopentyl, cyclohexyl, cycloheptyl, norbornyl, and the like.

The term "alkylene" refers to a bivalent alkyl group. An "alkylene chain" is a polymethylene group, i.e., —$(CH_2)_n$—, wherein n is a positive integer, preferably from 1 to 6, from 1 to 4, from 1 to 3, from 1 to 2, or from 2 to 3. A substituted alkylene chain is a polymethylene group in which one or more methylene hydrogen atoms are replaced with a substituent. Suitable substituents include those described below for a substituted aliphatic group.

The term "alkenylene" refers to a bivalent alkenyl group. A substituted alkenylene chain is a polymethylene group containing at least one double bond in which one or more hydrogen atoms are replaced with a substituent. Suitable substituents include those described below for a substituted aliphatic group.

The term "alkoxy" means an alkyl radical attached through an oxygen linking atom, represented by —O-alkyl. For example, "($C_1$-$C_4$)alkoxy" includes methoxy, ethoxy, propoxy, and butoxy.

The term "aryl," used alone or as part of a larger moiety, refers to monocyclic or bicyclic ring systems having a total of five to fourteen ring members, wherein at least one ring in the system is aromatic and wherein each ring in the system contains 3 to 7 ring members. The term "aryl" may be used interchangeably with the term "aryl ring." In certain embodiments of compounds described herein, "aryl" refers to an aromatic ring system which includes, but is not limited to, phenyl, naphthyl, anthracyl and the like, which may bear one or more substituents. It will be appreciated that an "aryl" group can comprise carbon and heteroatom ring members.

As described herein, compounds described herein may contain "optionally substituted" moieties. In general, the term "substituted," whether preceded by the term "optionally" or not, means that one or more hydrogens of the designated moiety are replaced with a suitable substituent. Unless otherwise indicated, an "optionally substituted" group may have a suitable substituent at each substitutable position of the group, and when more than one position in any given structure may be substituted with more than one substituent selected from a specified group, the substituent may be either the same or different at every position. Combinations of substituents envisioned by this disclosure are preferably those that result in the formation of stable or chemically feasible compounds. The term "stable," as used herein, refers to compounds that are not substantially altered when subjected to conditions to allow for their production, detection, and, in certain embodiments, their recovery, purification, and use for one or more of the purposes disclosed herein.

Mechanocatalytic oxidative cracking is used to overcome the chemical inertness of poly(ethylene) (PE) and difficulties associated with processing this solid feedstock. As a non-limiting example, an $Fe_2O_3$-based Fenton system is applied to introduce oxygen-based functional groups to the PE backbone with hydrogen peroxide as the oxidant. Oxidative Fenton processes, which often include an iron salt as catalyst and an aqueous hydrogen peroxide solution as an oxidant, are known for oxidizing numerous organic molecules, but not for PE plastic chains. In general, PE backbone chains are known to be ruptured photo-oxidatively in natural environment, which is caused by the formation of carbonyl groups on the PE backbone that can then undergo homolytic cleavage or generate intramolecular hydrogen abstraction.

Mechanochemical processes for depolymerization of biomass, most notably cellulose and lignin, and plastics such at polystyrene (PS) and polyethylene terephthalate (PET) are known in the field and has been summarized in U.S. Patent Publication Number 2023/0107759, the entirety of which is hereby incorporated by reference. However, as described above, these processes fail in depolymerization of polyethylene (PE) due to the intrinsic inertness of the PE backbone.

In industrial processes, heterogeneous (i.e., solid) catalysts are generally preferred because they can be easily separated from products and residual reactants. However, during solid feedstock conversion, it is challenging to provide sufficient catalyst-feed contact. Mechanocatalytic depolymerization (using, for example, ball mills or rods) is an unconventional approach to process solid feedstocks with a solid catalyst in an economically viable way that does not require solvents. While there are gaps in the fundamental understanding of mechanochemistry, mechanocatalytic depolymerization has been demonstrated on a lab scale for lignocellulosic biomass, cellulose, lignin, and chitin. In addition to the attractiveness of chemically depolymerizing plastics essentially in the solid phase, milling is a highly scalable industrial process, and its many applications include the production of several billion tons per year of cement. Ball mills operate with electrical energy and are thus also compatible with the increasing availability of electricity from renewable sources. Mechanocatalysis thus has many advantages over other unconventional approaches such as biological depolymerization by microbes/enzymes, which must overcome large challenges in productivity, resistance to contaminants, and separations especially when handling mixed-waste feedstocks.

In catalytic ball milling, mechanical forces are used to shear reactants and catalysts against each other, creating an intimate contact as well as providing energy required for reactions. Recent work demonstrated mechanochemical depolymerization of lignin, resulting in mostly monomeric and dimeric products using solid NaOH as a base catalyst and a few drops of methanol as a stabilizer for reactive intermediates. Chemical reactions are accelerated as explained by various mechanisms, e.g., generation of "hot spots," formation of highly active catalytic sites, and tribo-electric effects. For example, recent experimental and modeling studies show that transient "hot spots" (>1100° K) are generated when $CaCO_3$ is milled with steel balls to form CaO and $CO_2$. Prior works have demonstrated that milling with $Cr_2O_3$ catalysts created highly active sites for CO oxidation to $CO_2$ (See, e.g., Rashidi, F., et al., ACS *Sustainable Chemistry & Engineering* 5:1002-1009 (2016)). The effects of different mechanisms can vary depending on the specific process of interest.

Polymer recycling also requires processing steps for product separation and reactant/feedstock recycle. Greater complexity is created in mixed feedstocks, e.g., PET containing smaller amounts of poly(amide)s (nylon), cellulosics (cotton/rayon), or PVC. This results in complex multicomponent products that contain monomers, partially depolymerized species, and well as unreacted colloidal species resulting from the non-PET components.

Described herein is a method and system to crack polyethylene (PE) by combining the heterogeneous Fenton process and mechanocatalysis. This process can occur under ambient conditions (i.e., without external heating or pressure) and employs an oxygen source such as hydrogen peroxide or ozone, and a transition metal catalyst, such as environmentally benign metal oxide (e.g., $XO_2$ or $X_2O_3$), metal phosphate ($XPO_4$) or metal carbide (e.g., $X_2C$, $X_3C_2$, or $X_4C_3$) where X can be Fe, Ti, Zr, Ru, Mn, Ce, V, Ni, Co, Mo, Sr, Cr, Ta, W, etc. Once an oxygen-based functional group is introduced, the polymer chain can be cleaved to achieve cracking effectivity, with only CO, $CO_2$, $O_2$, and $H_2O$ as gaseous by-products. The resulting fragments can be used as intermediates to produce fuels and chemicals. In certain embodiments, the method and system can be used as a pretreatment process for plastic waste intended for recycling or upcycling.

As shown in FIG. 1A, an exemplary embodiment of the present disclosure provides an example solvent-free system 100 that includes a vessel 120 that holds one or more inert or chemically reactive solid grinding bodies 130, and a reaction mixture 101. System 100 can mechanocatalytically depolymerize polymer feedstock 102 into one or more depolymerized polymer feedstock 106 that includes smaller polymers, oligomers, or monomers. When a polymer feedstock 102 is mechanically agitated or impacted by the solid grinding bodies 130 in the vessel 120 in the presence of an activating agent 104 the polymer feedstock 102 is broken down into smaller molecular weight polymers that may contain functional groups and thus show higher reactivity than the original polymer feedstock 102. The polymer feedstock 102 can be any waste plastic or conventional consumer products made from polymers, including, for example, plastic bottles, shopping bags, storage containers, appliance housings, toys, and the like.

In some embodiments, the reaction mixture 101 can include one or more polymer feedstocks 102 and an activating agent 104. The reaction mixture 101 can be mixed together outside of the vessel 120 or can be added in stages into the vessel 120 to be mixed upon initiation of the mechanocatalytic depolymerization (e.g., in the presence of solid grinding bodies 130). In certain embodiments, when the solid grinding bodies 130 comprise a catalytic functional group on the surface or within the bulk of the body, the reaction mixture 101 can include polymer products 102 and an oxygen source. When grinding bodies 130 are catalytic, the grinding bodies 130 can also act as the catalyst 108 in the system 100.

In certain embodiments, the reaction mixture 101 can be heated prior to agitation with the solid grinding bodies 130. As would be appreciated by those of skill in the art, heating a polymer above its glass transition temperature can initiate a change in physical properties of the polymer. Alternatively, or in addition thereto, the reaction mixture 101 can be chilled at the time or after agitation with the solid grinding bodies 130 occurs. The mechanocatalytic depolymerization can be an exothermic reaction that generates heat during the agitation of the reaction mixture 101 such that chilling or removal of heat from the vessel 120 can generate increased yields of depolymerized polymer 116 or decreased time required to produce depolymerized polymer 116.

In some embodiments, the vessel 120 or the contents within the vessel 120 may be cooled to enhance the brittleness of the polymer feedstock 102, thus enabling the mechanical shearing action of the grinding bodies 130 against the polymer feedstock 102 to more readily break down the polymer and increase the ease of forming the depolymerized polymer 116.

The polymer feedstock 102 can be polymers of the general formula: —$(CH_2CHR)_n$—, where R is one or more of an aliphatic group, an alkyl group, a cycloalkyl group, an aryl group, alkene group, or an alkenylene group, and n can range from about 4 to about 5,000,000. In some embodiments, the polymer feedstock 102 has a molecular weight equal to or greater than 500 g/mol. The polymer feedstock 102 can be a polyolefin produced from an olefin or alkene as a monomer, such as polyethylene (PE) or polystyrene (PS). As would be appreciated by those of skill in the art, the polymer feedstock 102 can have a range of properties depending on its molecular weight, R branching groups, and thickness and orientation of the material. For instance, a plastic water bottle may have a melting temperature ranging from about 220° C. to about 280° C., whereas a plastic storage bag may have a melting temperature ranging from about 90° C. to about 120° C. In either example, the mechanochemical depolymerization system 100 can yield a smaller molecular weight polymer (depolymerized polymer 116) after combining the plastic water bottle or the plastic storage bag with the activating agent 104 and agitating with the grinding bodies 130.

The depolymerized polymer 116 can include a mixture of smaller polymers, oligomers or monomers that break down from the polymer feedstock 102. In some embodiments, when the polymer feedstock 102 is a homopolymer, the resulting depolymerized polymer 116 is the same monomer of varying lengths. In other embodiments, when the polymer feedstock 102 is a copolymer or a polymer blend, the resulting depolymerized polymer 116 can be a mixture of monomers of varying structure and length. In either instance, the smaller polymers may include one or more functional groups that contain an oxygen within the backbone and/or branched with alcohols, ketones, aldehydes, lactones, carboxylic acids, alkanes, and the like. In some embodiments, these depolymerized polymers 116 may be reintroduced to the vessel 120 for further depolymerization. The depolymerized polymer 116 may be collected for use in the hydrocarbon production and refinery industries. In certain embodiments, the system 100 may be optimized to produce depolymerized polymers 116 that are collected as independently useful products such as surfactants or lubricants.

In some embodiments, the activating agent 104 can include a reaction product of a catalyst 108 and an oxidizing agent 110. Although not depicted in FIG. 1A, the activating agent 104 may be produced outside of the vessel 120 and introduced to the reaction mixture 101 through an inlet in the vessel 120. Alternatively, the activating agent 104 may be produced inside the vessel 120 by adding the catalyst 108 and oxidizing agent 110 to the vessel 120 at the same time as the polymer feedstock 102 and grinding bodies 130 (e.g., as a "one pot" reaction).

Figure 1B:
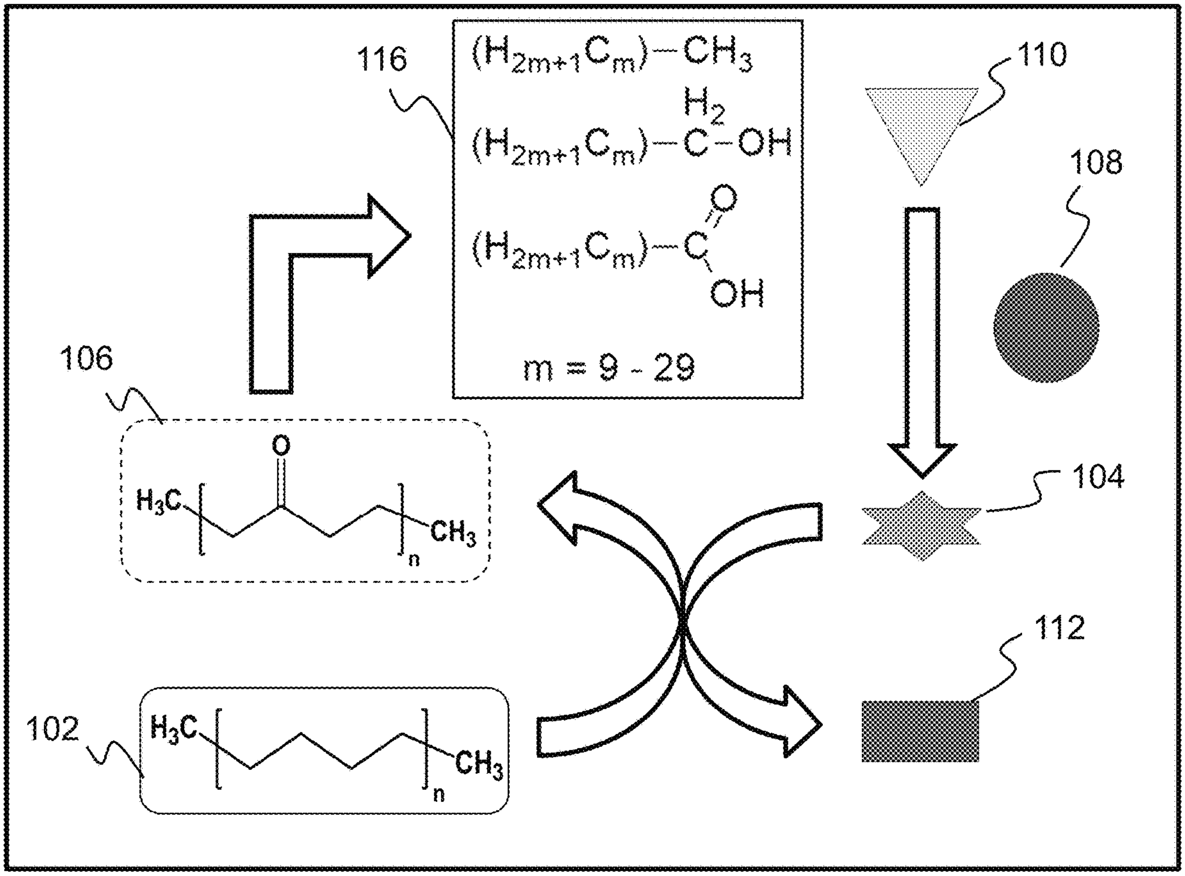
FIG. 1B provides a schematic of an example mechanism for mechanocatalytic oxidative cracking of polymer feedstocks, in accordance with an exemplary embodiment of the present disclosure.

As shown in FIG. 1B, the circle shape represents the catalyst 108 in an example redox reaction. As shown, the catalyst 108 remains intact, and can react with various reactants, such as the triangle, representing an oxidizing agent 110. In the example mechanism provided in FIG. 1B, the catalyst 108 maintains its shape, but undergoes a reversible change in size. The change in size is representative of a change in oxidation state of the solid metal-based catalyst as electrons are transferred between the catalyst 108 and the oxidizing agent 110 to produce the activating agent 104. In certain non-limiting embodiments, the catalyst 108 can include transition metal oxides or other redox active catalysts including iron oxide, titanium dioxide, zirconium dioxide, ruthenium oxide, manganese oxide, cerium oxide, molybdenum oxide, vanadium oxide, nickel oxide, cobalt oxide, tungsten carbide, and the like.

As mentioned above, the oxidizing agent 110, depicted as a triangle, can react with the catalyst 108 and form the activating agent 104 (depicted as a star-shape in FIG. 1B) and one or more by-products 112, in some instances (represented as a rectangle in FIG. 1B). By-products 112 can include free protons, hydroxides, water, and/or oxygen. In some instances, the by-products 112 can include carbon dioxide or carbon monoxide. The oxidizing agent 110 can be a reactive oxygen species or compound capable of becoming reactive, including, for example, hydrogen peroxide, oxygen, hydroxide, ozone, organic peroxides such as tert-butylperoxybenzoate, or combinations thereof. The oxidizing agent 110 can have a concentration ranging from about 1 wt. % to about 80 wt. %. In some embodiments, the oxidizing agent introduces a functional group that facilitates the cracking of the otherwise chemically stable hydrocarbon chain and produces an oxidized polymer with a functional group comprising an oxygen. However, in some embodiments the oxygen may be stabilized and removed with a carbon on the hydrocarbon chain to produce a gaseous by-product such as carbon monoxide or carbon dioxide.

As shown in FIG. 1B, example depolymerized compounds and/or polymers 116 can include hydrocarbon chains as well as compounds that contain one or more oxygen atoms. Although not depicted in FIG. 1B, the catalyst 108 may further react with the oxygen-based functional group on the depolymerized compound and/or polymer 116 to remove CO or $CO_2$ to produce an oxygen-free hydrocarbon depolymerized polymer 116.

Figure 1C:
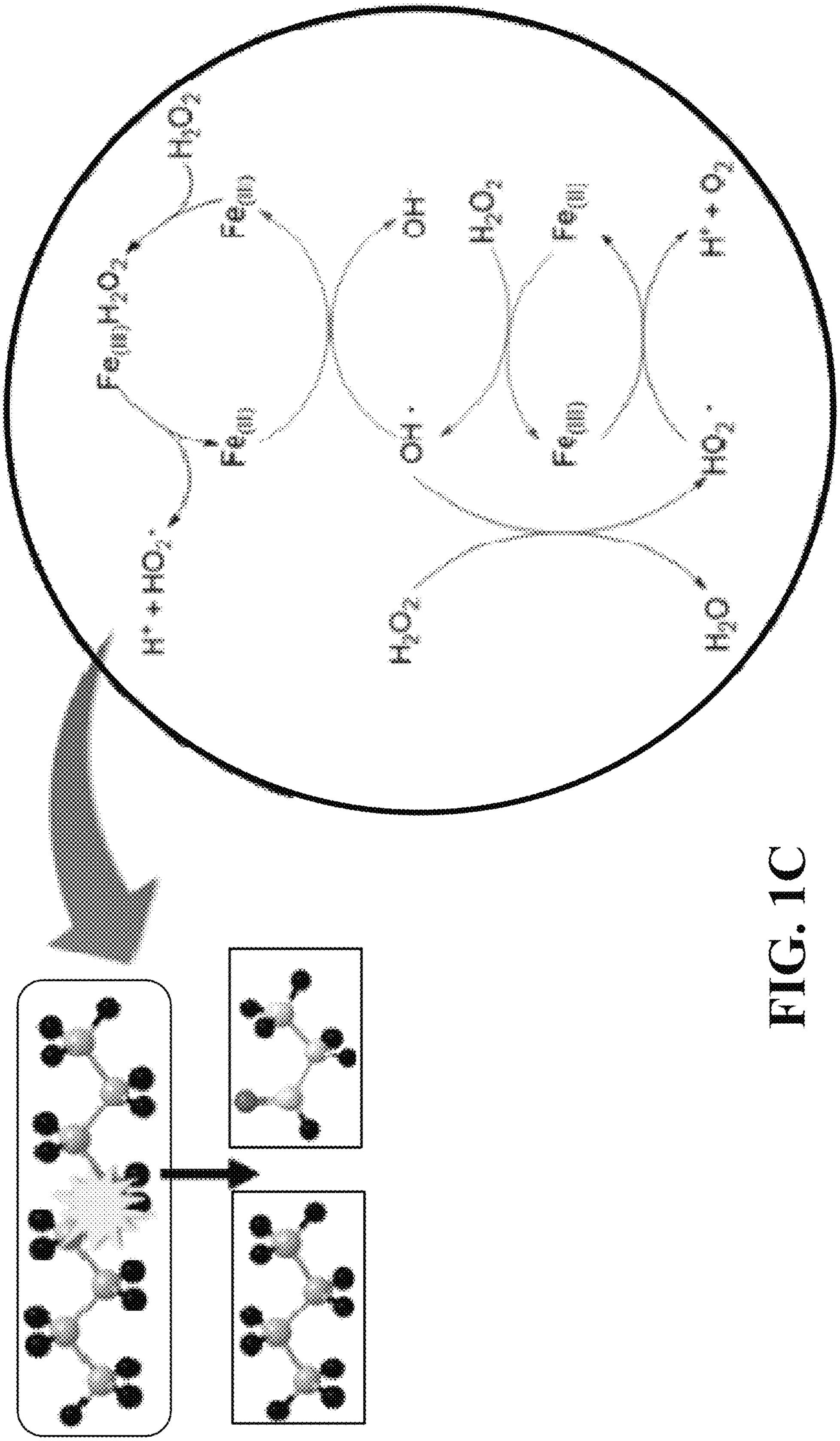
FIG. 1C provides a schematic of an example mechanism for the catalytic production of an activating agent that can introduce a functional group to the PE backbone, in accordance with an exemplary embodiment of the present disclosure.

Turning to FIG. 1C, a non-limiting example redox reaction includes an iron-based catalyst that can react with peroxide ($H_2O_2$) oxidant to form an activating agent ($HO_2\cdot$) that can introduce an oxygen-based functional group to a polyethylene backbone. With an oxygen-based functional group in the polymer feedstock 102, the polymer chain can be cleaved in the system 100 under impaction with the grinding bodies 130 of FIG. 1A. As shown, the only by-products include CO, $CO_2$, $O_2$, and $H_2O$. In addition, the resulting fragments (e.g., hexane, n-icosane (20-carbon chain), n-triacontane (30-carbon chain), propanol, 1-pentacosanol (25-carbon chain with hydroxy group), propionaldehyde, and the like) can be used as intermediates to produce fuels and/or sustainable chemicals.

The vessel 120 can include one or more chambers comprising stainless steel or other inert solid material. Alternatively, the vessel 120 can include a reactive surface coating or be impregnated with a reactive species.

The vessel 120 can be any size suitable for the scale of the mechanochemical depolymerization to occur. In general, an excess of oxidizing agent 110 within the vessel 120 can feed the mechanochemical depolymerization process to generate sufficient activating agent 104 that can be used to convert polymer feedstock 102 into depolymerized polymer 116. During and after the mechanochemical depolymerization, oxygen to carbon ratios up to 100/1000 can result, indicating the effective incorporation of oxygen functional groups into the backbone of the polymer feedstock 102.

In general, mechanocatalytic depolymerization system 100 is an environmentally friendly process for the breakdown and recycling of polyethylene. In particular, the vessel 120 can be solvent-free during the mechanocatalytic depolymerization process and generate mild by-products such as carbon monoxide or carbon dioxide that can be collected without being released to the atmosphere. In addition, the headspace within the vessel 120 comprises ambient air without adding external heat or pressure.

Referring back to FIG. 1A, the system 100 can include grinding bodies 130 that can create interactions between neighboring grinding bodies, the polymer feedstock 102, the catalyst 108, the walls of the vessel 120, and oxidized polymer 106 to ultimately form depolymerized polymer 116. In some embodiments, the grinding bodies 130 can include one or more balls, hammers, rods, and the like. The grinding bodies 130 can be made entirely of stainless steel or other inert solid material. Alternatively, the grinding bodies 130 can be coated with a reactive surface or impregnated with a reactive species, while the bulk of the material is inert.

Figure 2A:
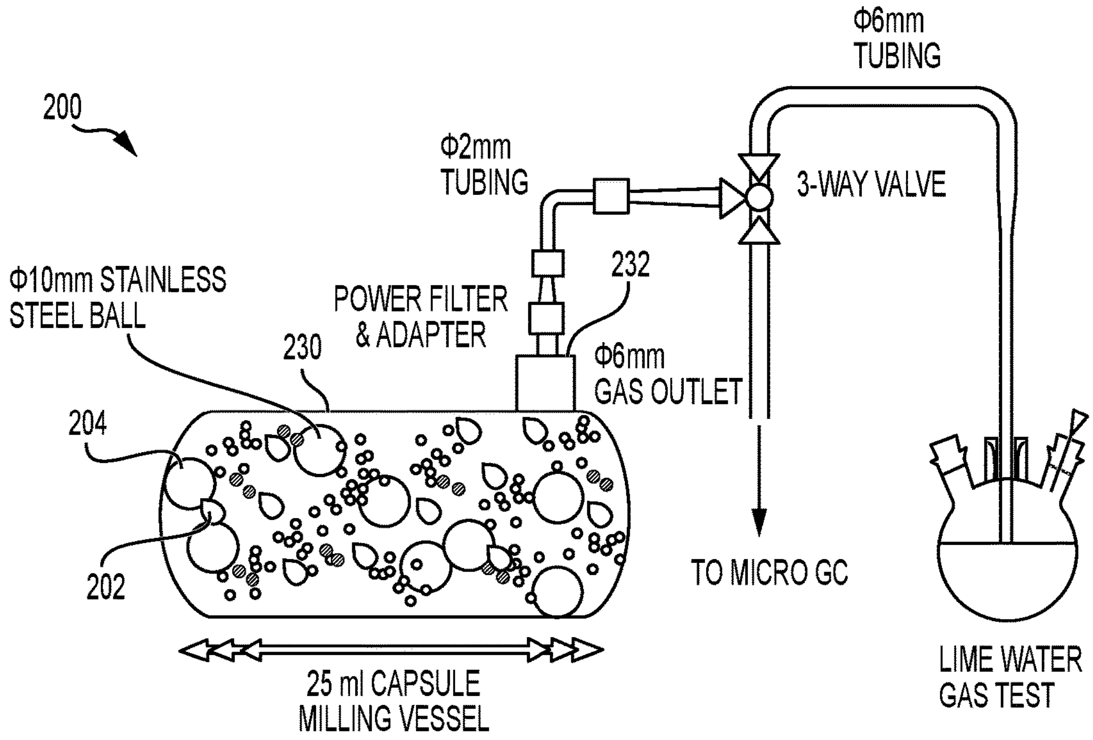
FIGS. 2A and 2B provide a schematic (FIG. 2A) and an image (FIG. 2B) of an example experimental setup for mechanocatalytic cracking of a polymer feedstock, in accordance with an exemplary embodiment of the present disclosure.
Figure 2B:
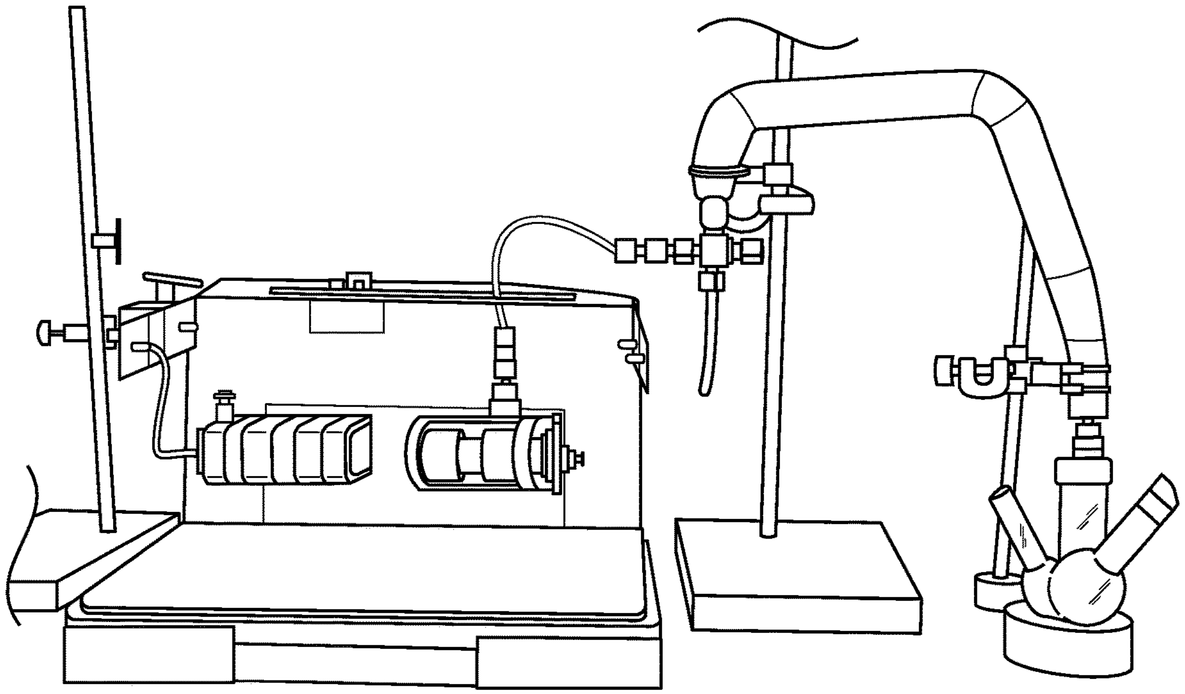

Turning to FIG. 2A, the system 200 can include a milling vessel 220 having stainless steel grinding bodies 230 being agitated along the horizontal axis via vibrations or translational motion. As shown, the vessel 220 also includes a reaction mixture 201 of polymer feedstock 202 and activating agent 204 formed from a catalyst 208 and an oxidizing agent 210. In addition, system 200 can include an outlet 232 for gas by-products to be removed and/or collected. FIG. 2B is an image of an example experimental setup for mechanocatalytic cracking of FIG. 2A.

Figure 3:
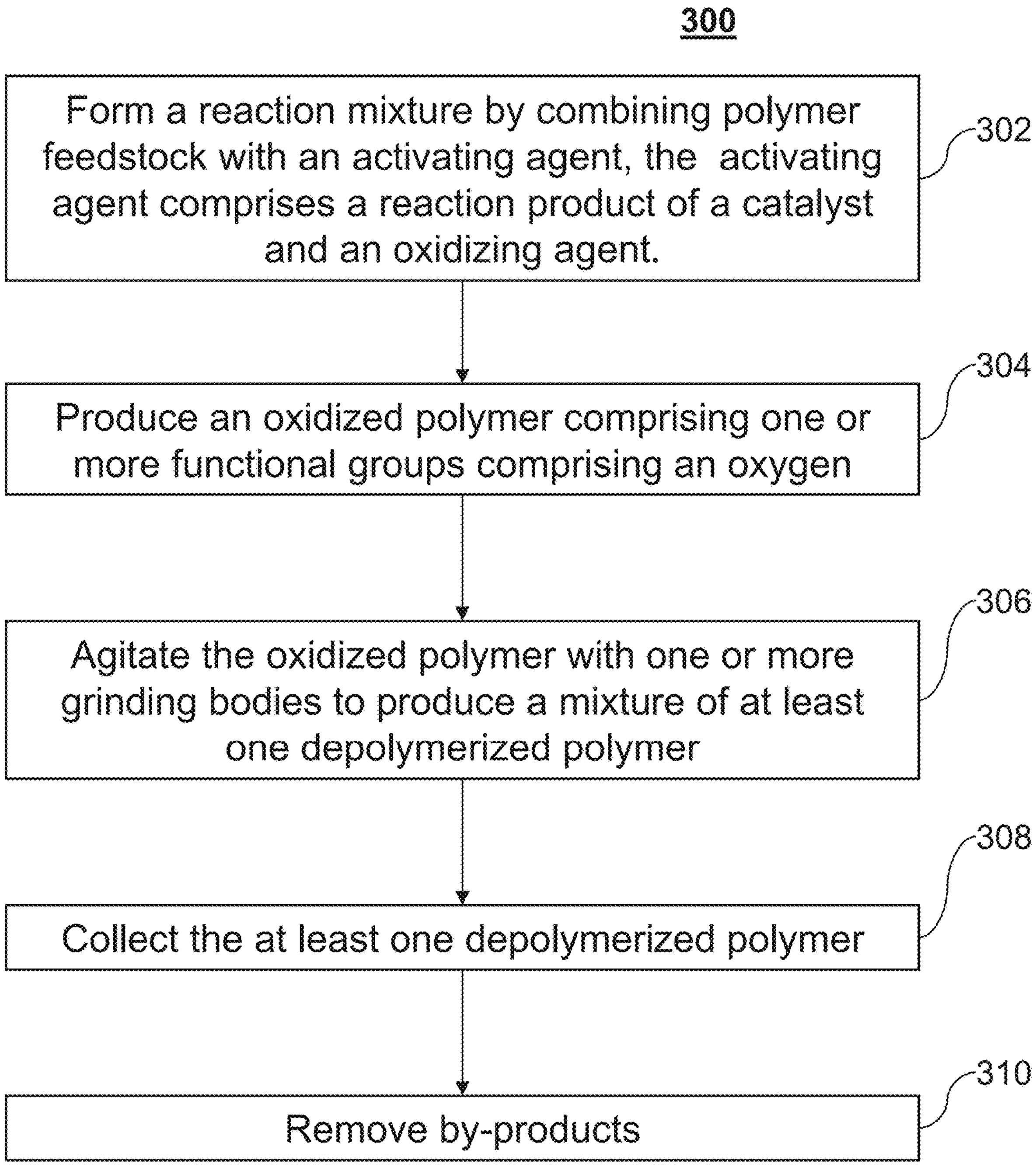
FIG. 3 is a flowchart of a method of mechanocatalytic oxidative cracking of polymer feedstocks, in accordance with the disclosed technology.

FIG. 3 is a flowchart of a method 300 of mechanocatalytic oxidative cracking of polymer feedstocks. The method 300 can include forming a reaction mixture 101 in step 302 by combining polymer feedstock 102 with an activating agent 104. The activating agent 104 can include a reaction product of a catalyst 108 and an oxidizing agent 110. Method 300 can next include producing an oxidized polymer 106 comprising one or more functional groups in the backbone or branched from the backbone of the polymer feedstock 102 at step 304. The oxidized polymer 106 can include an oxygen atom, such as a hydroxyl, carbonyl, and/or carboxylic acid. Method 300 can also include agitating the oxidized polymer 106 with one or more grinding bodies 130 to produce a mixture of at least one depolymerized polymer 116 at step 306. The depolymerized polymer 116 can include a polymer of smaller molecular weight compared to the polymer feedstock 102. The grinding bodies 130 can be balls, rods, or hammers and can either be inert or contain chemically reactive materials. Method 300 can next include collecting the at least one depolymerized polymer 116 at step 308. In addition, method 300 may include removing by-products 112 from vessel 120 at step 310. As will be appreciated, the method 300 just described can include any of the previous examples described herein.

Figure 4:
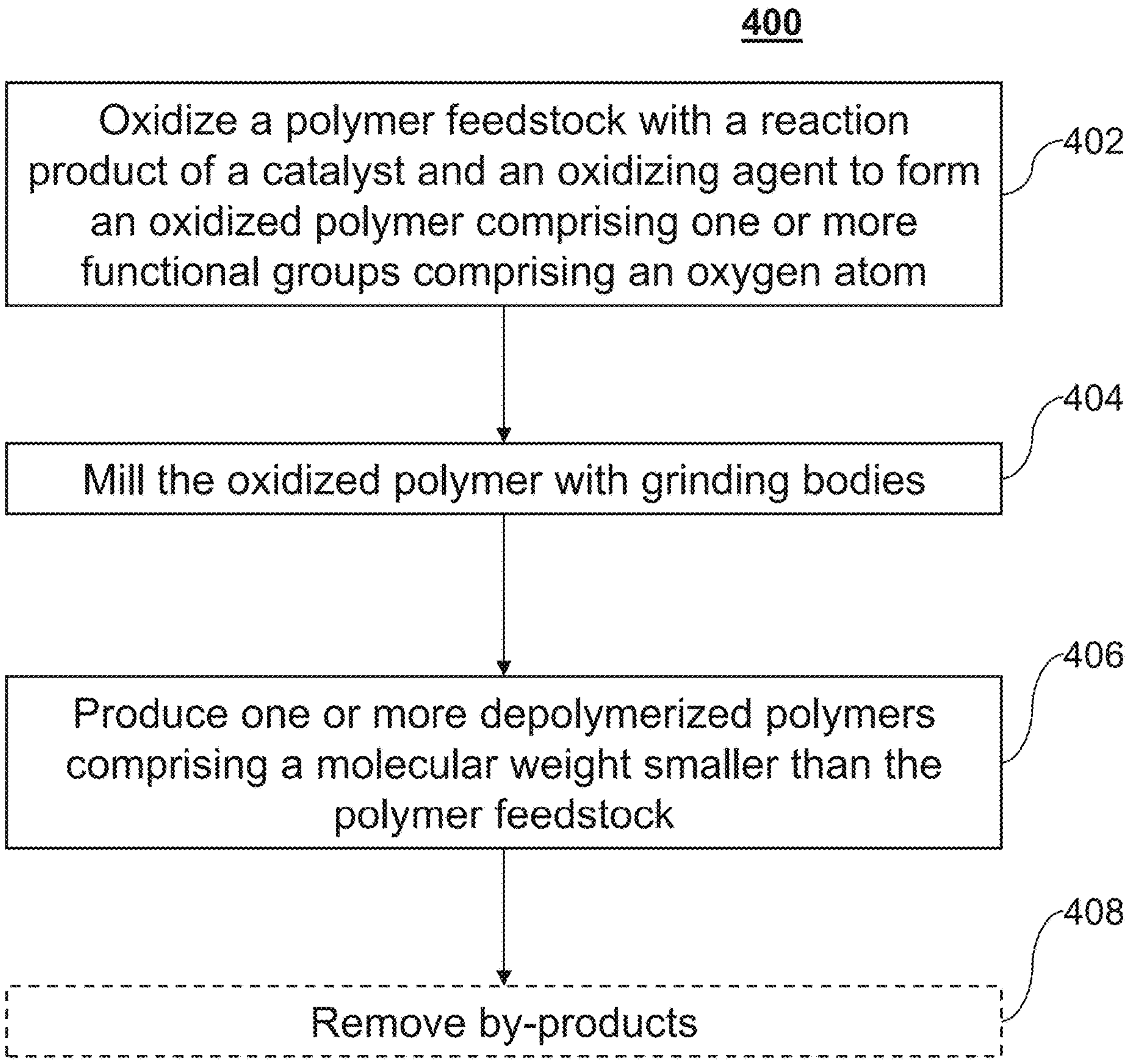
FIG. 4 is a flowchart of a method of mechanocatalytic oxidative cracking of polymer feedstocks, in accordance with the disclosed technology.

FIG. 4 is a flowchart of a method 400 of mechanocatalytic oxidative cracking of polymer feedstocks. Method 400 can include oxidizing a polymer feedstock 102 in step 402 with a reaction product of a catalyst 108 and an oxidizing agent 110 to form an oxidized polymer 106. The oxidized polymer 106 can include one or more functional groups comprising an oxygen atom, such as a hydroxyl, carbonyl, and/or carboxylic acid. Method 400 can next include milling the oxidized polymer 106 with grinding bodies 130 at step 404. The grinding bodies 130 can be balls, rods, or hammers and can either be inert or contain chemically reactive materials. Method 400 can also include producing one or more depolymerized polymers 116 comprising a molecular weight smaller than the polymer feedstock 102 at step 406. Method 300 can end at step 406 or can optionally include removing by-products 112 from vessel 120 at step 408. As will be appreciated, the method 400 just described can include any of the previous examples described herein.

Figure 5A:
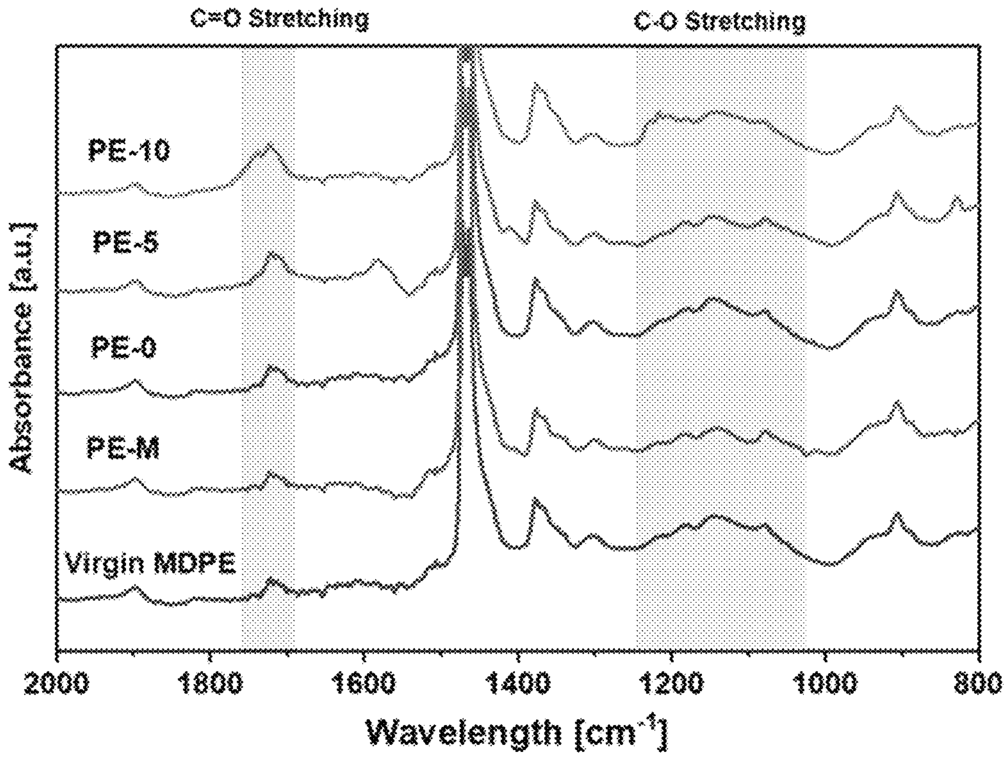
FIG. 5A is FTIR spectra of various example reaction mixtures, in accordance with an exemplary embodiment of the present disclosure.
Figure 5B:
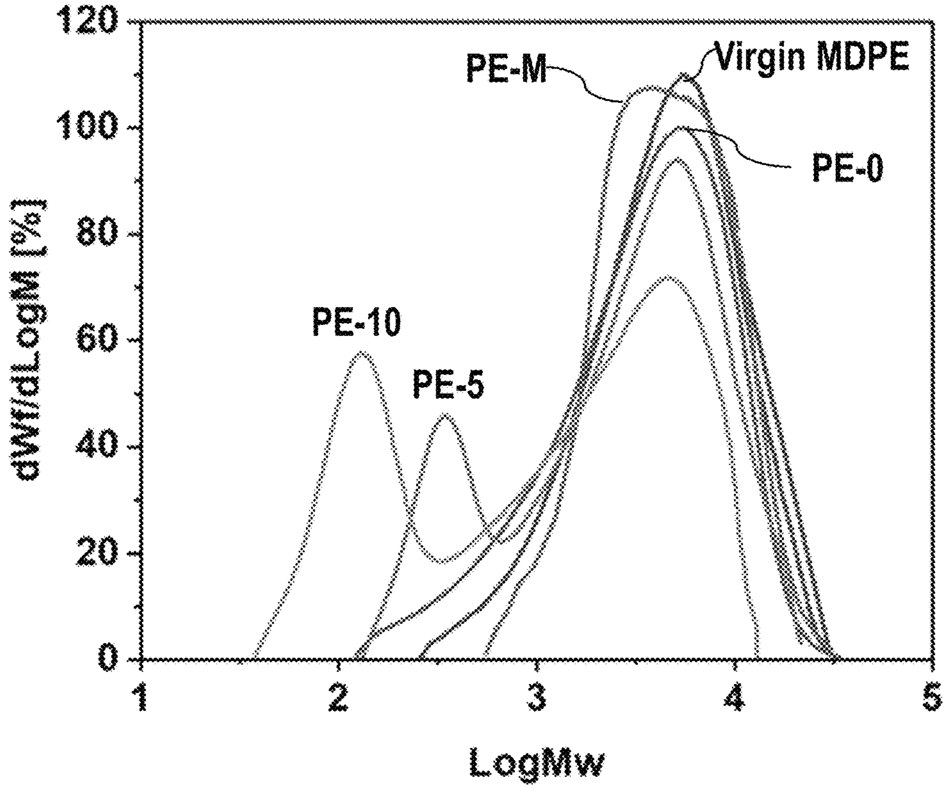
FIG. 5B is a plot of molecular weight distribution (MWD) determined by HT-GPC for various example reaction mixtures, in accordance with an exemplary embodiment of the present disclosure.

FTIR spectra shown in FIG. 5A indicate that for MDPE milled with 5 wt. % and 10 wt. % loading of $Fe_2O_3$, and with the $$\frac{m_{MDPE}}{m\mathrm{H_2O_2/H_2O}} = 1{:}1,$$

the absorption shows prominence in intensity around the area of 1700 $cm^{-1}$ to 1750 $cm^{-1}$, with two peaks at 1705 $cm^{-1}$ and 1735 $cm^{-1}$, which is attributed to the presence of ketone and/or aldehyde groups. The presence of ester groups was found at 1210 $cm^{-1}$. HT-GPC analysis in FIG. 5B shows the distinct bimodal molecular weight distribution (MWD) when a catalyst, such as $Fe_2O_3$, is present. The resulting values of Mw and Mn are thus reduced significantly. The high value of PDI showed a high degree of heterogeneity in the polymer sample. A morphological study illustrates the fragmentation of PE particles with the incorporation of $Fe_2O_3$ inside an PE agglomerate. This might be the result of a mechanically excited, mobilized surface domain. Micro GC analysis shows the formation of $CO_2$, CO and $O_2$. The formation of $CO_2$ and CO shows that parts of MDPE are oxidized and eliminated from the polymer chain in the process. The yield in $CO_x$ is significantly elevated when $Fe_2O_3$ is present and correlates with the catalyst loading. This could speak for separate catalytic processes, namely decarbonylation yielding CO and decarboxylation yielding $CO_2$. An overall reaction scheme can be proposed based on the information.

FIGS. 6A through 24B provide various data demonstrating the change in size from example polymer feedstock 102 such as virgin medium density polyethylene ("MDPE") to depolymerized polymer 116 after mechanocatalytic depolymerization in the system 100, 200, as discussed in more detail below.

The following examples further illustrate aspects of the present disclosure. However, they are in no way a limitation of the teachings or disclosure of the present disclosure as set forth herein.

EXAMPLES

A mixture of MDPE, $Fe_2O_3$ and an aqueous 30% $H_2O_2$ solution was ball milled in a Retsch MM400 shaker mill with a 25 ml stainless-steel vessel and eight 10 mm stainless-steel balls. MDPE was ball-milled under different conditions: solely mechanically (PE-M in Table 1), with 30 wt. % $H_2O_2/H_2O$ (PE-0 in Table 1), with 30 wt. % $H_2O_2/H_2O$ and 5 wt. % $Fe_2O_3$ loading, with 30 wt. % $H_2O_2/H_2O$ and 10 wt. % $Fe_2O_3$ loading (PE-5 and PE-10 in Table 1, respectively), with the ratio $$\frac{m_{MDPE}}{m_{H_2O_2/H_2O}} = 1:1$$

to establish the role of each part of the system. The milling frequencies (15, 20, and 25 Hz) (PE-15H, PE-20H, and PE-5 in Table 1, respectively), the milling times (60, 90, and 120 minutes) (PE-60M, PE-90M, and PE-120M in Table 1, respectively), were also varied. The introduction of oxygen-based functional groups on the PE backbone was qualitatively detected by Fourier-transform infrared spectroscopy (FTIR) and compared to that of virgin MDPE powder (FIG. 5A). All spectra showed minor peaks around 1050 $cm^{-1}$ to 1250 $cm^{-1}$ that were assigned to the C—O stretching modes of primary and secondary alcohols and a peak around 1700 $cm^{-1}$ corresponding to the C—O stretching mode of carbonyl groups. The presence of such groups in the virgin MDPE species can be attributed to the natural photodegradation of PE or the presence of oxygen-containing radical scavengers (anti-oxidants) inside the polymer sample. In the spectra of PE-5 (5 wt. %) and PE-10 (10 wt. %), the peaks between 1700 $cm^{-1}$ and 1750 $cm^{-1}$ became more prominent, indicating a greater abundance of carbonyl-containing groups. In the spectrum of PE-10, the peak at 1210 $cm^{-1}$ showed the presence of ester groups. The same peaks were observed in the IR spectra of the residues of all experiments (PE-15H, PE-20H, PE-60M, PE-90M, PE-120M) indicating the presence of the same types of oxygen-based functional groups (FIGS. 10A-11B).

TABLE 1

Reaction conditions and feed compositions in polyethylene conversions experiments.

| ID | Reaction Composition/Conditions | Milling Time [min] | Milling Freq. [Hz] | $M_n$ [g/mol] | $M_W$ [g/mol] | PDI |
|---|---|---|---|---|---|---|
| Virgin MDPE | Unmilled | — | — | 2784 | 5876 | 2.11 |
| PE-M | 1 g MDPE | 90 | 25 | 3464 | 5841 | 1.68 |
| PE-0 | 1 g MDPE + 1 g 30 wt. % $H_2O_2/H_2O$ | 90 | 25 | 1753 | 4892 | 2.79 |
| PE-5 | 1 g MDPE + 1 g 30 wt. % $H_2O_2/H_2O$ + 50 mg $Fe_2O_3$ | 90 | 25 | 1141 | 4296 | 3.76 |

TABLE 1-continued

Reaction conditions and feed compositions in polyethylene conversions experiments.

| ID | Reaction Composition/Conditions | Milling Time [min] | Milling Freq. [Hz] | $M_n$ [g/mol] | $M_W$ [g/mol] | PDI |
|---|---|---|---|---|---|---|
| PE-10 | 1 g MDPE + 1 g 30 wt. % $H_2O_2/H_2O$ + 100 mg $Fe_2O_3$ | 90 | 25 | 338 | 2619 | 7.74 |
| PE-15H | 1 g MDPE + 1 g 30 wt. % $H_2O_2/H_2O$ + 50 mg $Fe_2O_3$ | 90 | 15 | 457 | 3536 | 7.74 |
| PE-20H | 1 g MDPE + 1 g 30 wt. % $H_2O_2/H_2O$ + 50 mg $Fe_2O_3$ | 90 | 20 | 902 | 3422 | 3.79 |
| PE-60M | 1 g MDPE + 1.5 g 30 wt. % $H_2O_2/H_2O$ + 50 mg $Fe_2O_3$ | 60 | 25 | 2200 | 4727 | 2.15 |
| PE-90M | 1 g MDPE + 1.5 g 30 wt. % $H_2O_2/H_2O$ + 50 mg $Fe_2O_3$ | 90 | 25 | 1837 | 4556 | 2.48 |
| PE-120M | 1 g MDPE + 1.5 g 30 wt. % $H_2O_2/H_2O$ + 50 mg $Fe_2O_3$ | 120 | 25 | 1146 | 4602 | 4.02 |

Figure 12A:
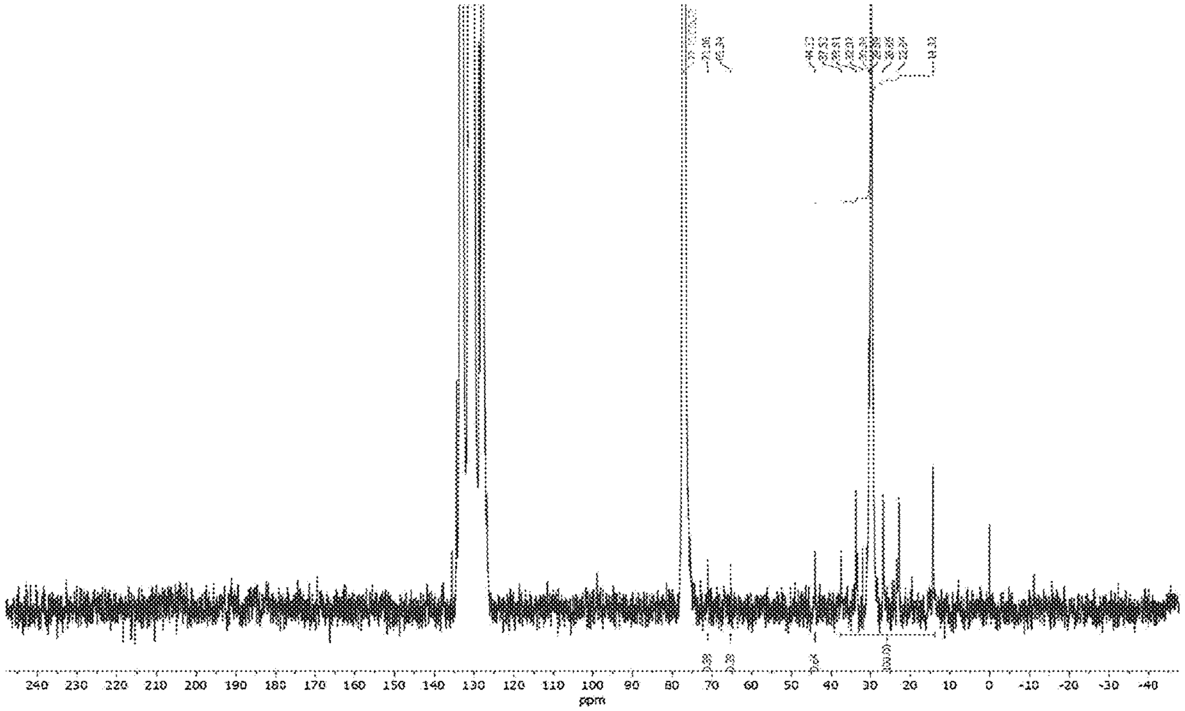
FIGS. 12A and 12B are $^{13}C$ NMR of virgin depolymerized polymer powder identified in Table 1 as "Virgin MDPE" (FIG. 12A) and depolymerized polymer after undergoing agitation in the system without catalyst or radical agent identified in Table 1 as "PE-M" (FIG. 12B), in accordance with an exemplary embodiment of the present disclosure.
Figure 12B:
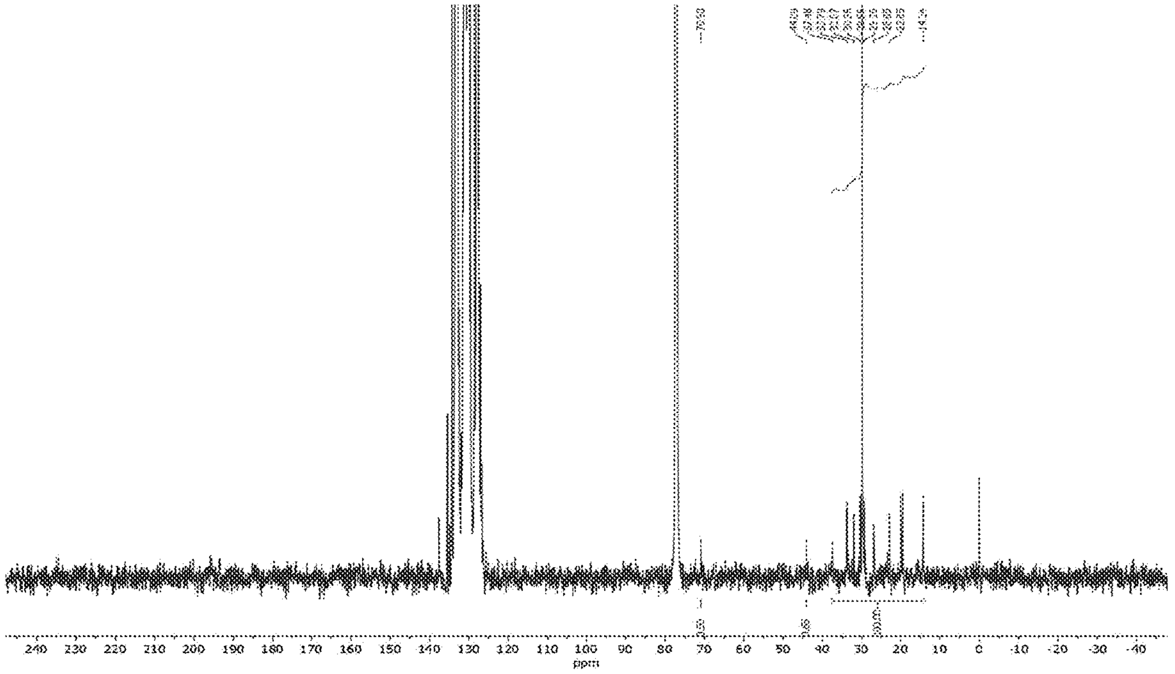
Figure 13A:
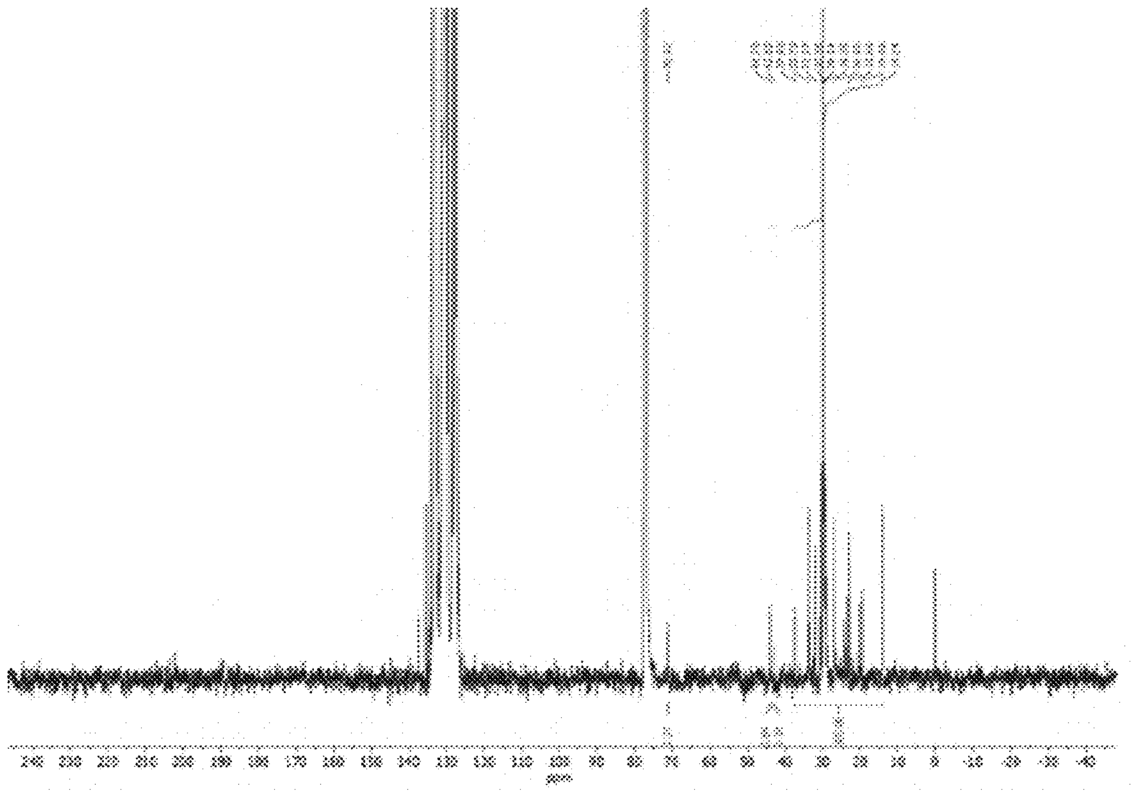
FIGS. 13A-13C are $^{13}C$ NMR of resulting depolymerized polymer from reaction mixture identified in Table 1 as "PE-0" in Table 1 (FIG. 13A), "PE-5" (FIG. 13B), and "PE-10" (FIG. 13C), in accordance with an exemplary embodiment of the present disclosure.
Figure 13B:
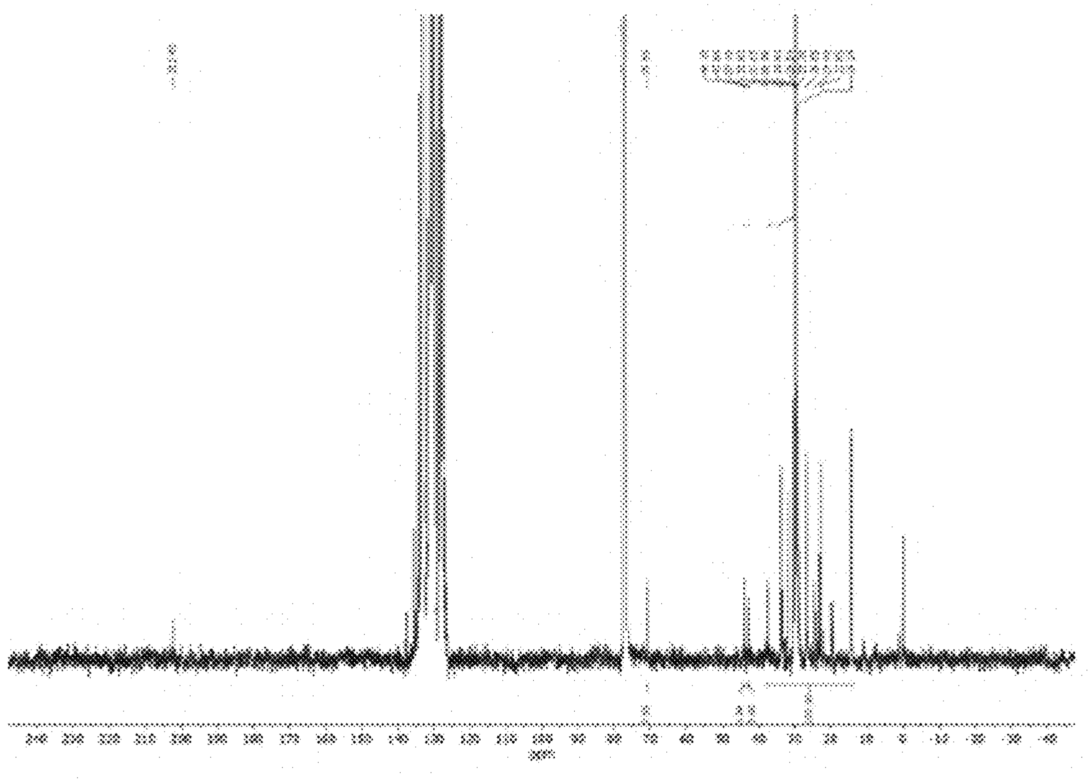

The $^{13}C$-NMR spectrum of PE-M showed limited presence of oxygen-based functional groups of the PE backbone (FIG. 12B). When $H_2O_2$ was present during the process (PE-0, PE-5, PE-10), $^{13}C$-NMR peaks associated with alcohols and carbonyl-containing groups were observed in the $CDCl_3$ soluble fraction of the product (FIGS. 13A and 13B). This trend is enhanced by the $Fe_2O_3$ catalyst in PE-5 and PE-10. This can be attributed to the heterogeneous Fenton process (FIGS. 13B and 13C), in which the surface-bound hydroxyl radicals HO· are created by the $Fe_2O_3$ catalyst to induce localized partial oxidation in the interface between iron oxide and MPDE. Such reactions may be made possible in a mechanochemical process because shear and frictions forces during collisions create molecular scale contacts of the surfaces of PE and the $Fe_2O_3$ particles that are minimal in conventional processes.

In photooxidative reactions, C—C bond scission in PE is enhanced when one of the carbon atoms is oxidized. Thus, the extent of C—C chain scission was probed by High-Temperature Gel Permeation Chromatography (HT-GPC) (FIG. 5B). Virgin MPDE had a Mw and Mn of 5876 and 2784 g/mol respectively with a unimodal distribution of molecular masses. Solely mechanically impacting MDPE (PE-M) or milling with the $H_2O_2$ solution in the absence of $Fe_2O_3$ (PE-0) resulted in limited formation of products with masses of 100-1000 g $mol^{-1}$, while the maximum of the distribution barely changed. Mechanical forces are known to homolytically rupture C—C bonds in polymers forming carbon radical fragments known as mechanoradicals, and this process is more significant for somewhat larger polymer molecules. When MDPE was milled with $Fe_2O_3$ and $H_2O_2$ (PE-5 and PE-10), a change from the unimodal to a bimodal distribution was observed, with a pronounced peak in the range of approximately 80-340 g $mol^{-1}$ with 10 wt % $Fe_2O_3$, which corresponds to hydrocarbons with about 6-25 carbon atoms. The resulting values of Mw and Mn were thus reduced significantly. The high value of the PDI showed a high degree of heterogeneity in the polymer sample after the experiment as fraction of the feedstock was converted to small molecules while a polymeric residue remained. Bimodal molecular weight distributions were observed for different experiments (FIGS. 10A-11B). Extended milling time led to the formation of smaller reaction products, while the milling frequency had a more complex influence on the MWD. Analysis of gaseous products by Micro Gas Chromatography (Micro GC) employed Dalton's law of partial pressure. The results showed the formation of $CO_2$, CO and $O_2$ when MDPE was milled with $Fe_2O_3$ and $H_2O_2$ (Table 2). The formation of $CO_2$ and CO showed that parts of MDPE were oxidized and eliminated from the polymer chain in the process. In additions, $O_2$ and $H_2O$ were formed by decomposition of $H_2O_2$ over the iron oxide catalyst via the Fenton/Haber-Weiss cycle. The yield in $CO_x$ was significantly elevated when $Fe_2O_3$ was present and correlated with the catalyst loading. This illustrates the elimination of oxidized carbon atoms from reaction intermediates by decarbonylation yielding CO and decarboxylation yielding $CO_2$.

TABLE 2

Detected yields of $O_2$, $CO_2$, and CO for example experiments.

| Experiment | $Yield_{O_2}$ $\left[\frac{mol_{O_2}}{mol_{H_2O_2}}\right]$ | $Yield_{CO_2}$ $\left[\frac{mg_{CO_2}}{g_{MDPE}}\right]$ | $Yield_{CO}$ $\left[\frac{mg_{CO}}{g_{MDPE}}\right]$ |
|---|---|---|---|
| PE-M | | 0.0016 | 0 |
| PE-0 | 0.0029 | 0.0044 | 0 |
| PE-5 | 0.0757 | 0.0411 | 0.0005 |
| PE-10 | 0.1145 | 0.0501 | 0.0014 |

Scanning (SEM) and transmission (TEM) electron microscope images coupled with energy dispersive x-ray spectrometry (EDX) and dynamic light scattering (DLS) particle size analysis (FIGS. 6A-8C) were used to observe the macroscopic characteristics of the material.

Figure 6A:
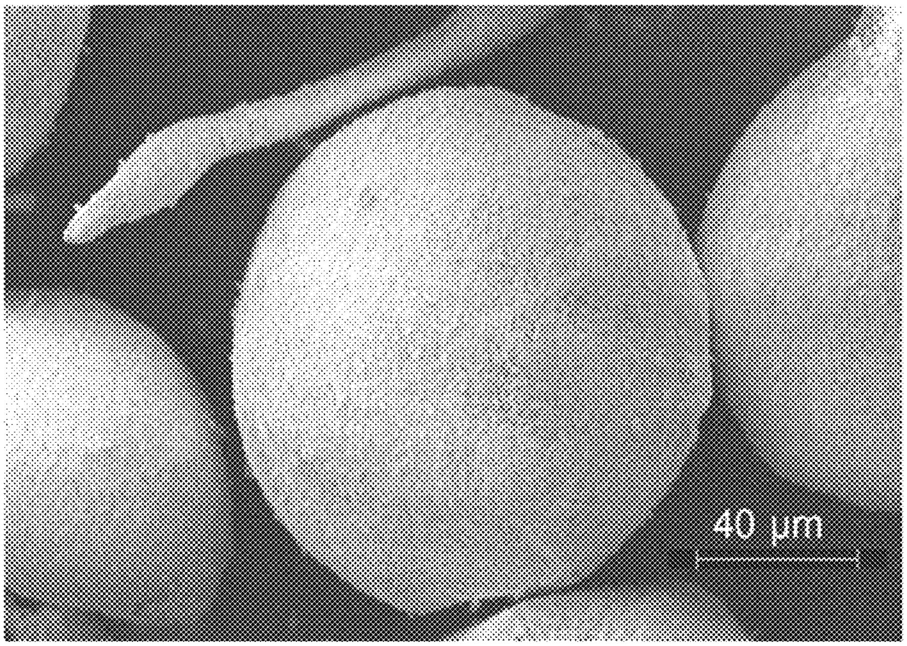
FIGS. 6A and 6B are SEM images of an example reaction mixture pre-reaction showing pre-reaction morphology of an example virgin polymer feedstock and catalyst (FIG. 6A), and post-reaction showing depolymerized polymer (FIG. 6B), in accordance with an exemplary embodiment of the present disclosure.
Figure 6B:
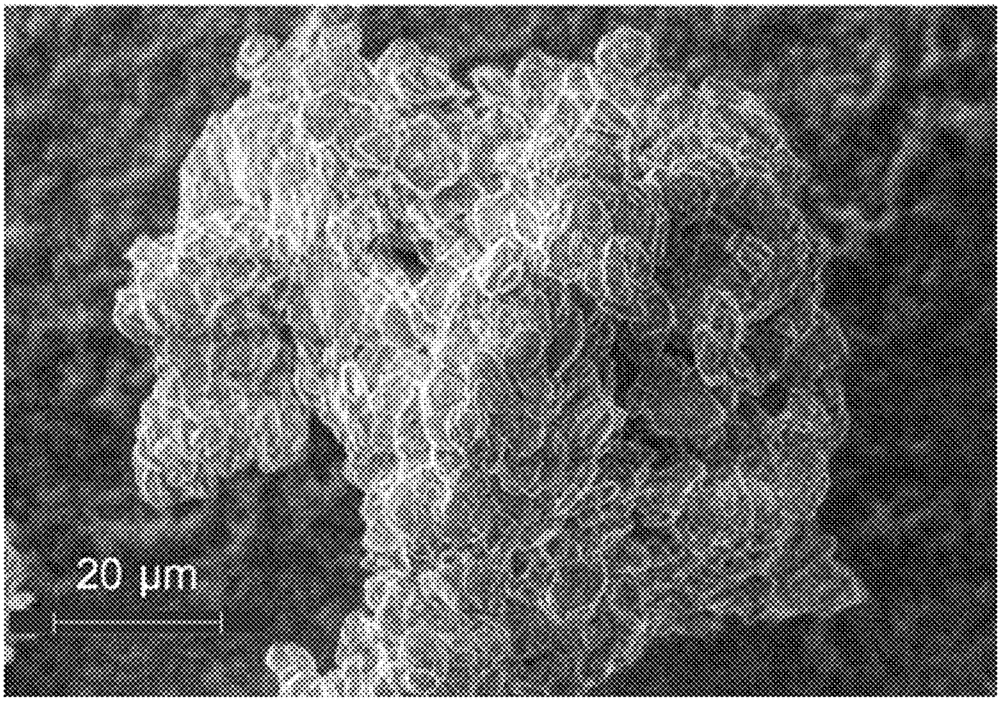
Figure 7A:
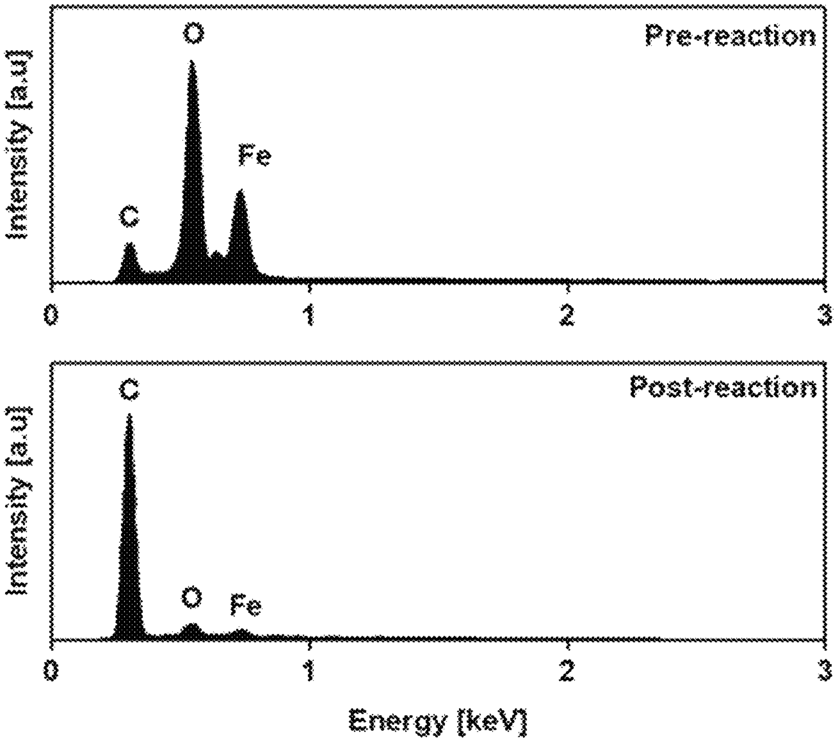
FIGS. 7A and 7B provide plots of energy-dispersive X-ray (EDX) (FIG. 7A), and particle size distribution (FIG. 7B) of a virgin polymer feedstock compared to example reaction mixtures, in accordance with an exemplary embodiment of the present disclosure.
Figure 7B:
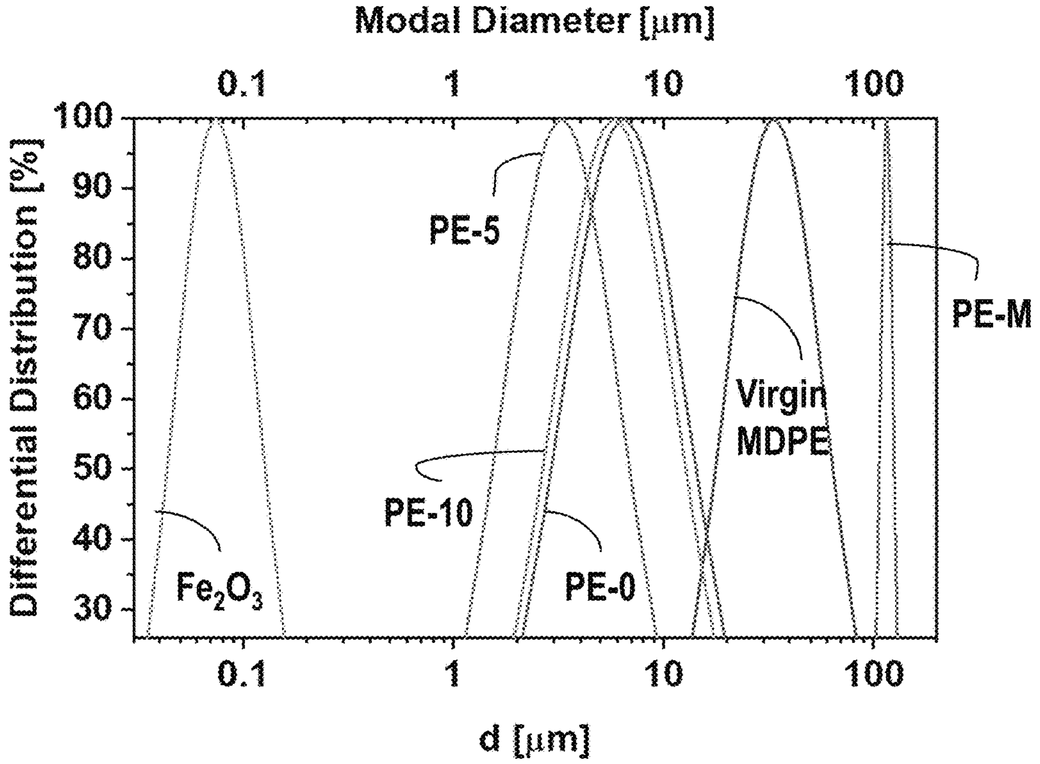
Figure 8A:
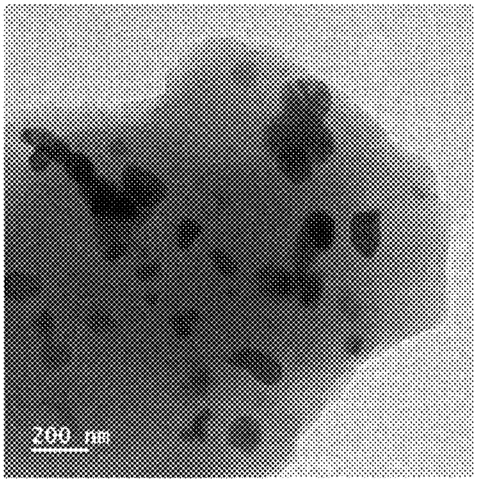
FIGS. 8A and 8B are TEM images of an example reaction mixture post-reaction showing depolymerized polymer, in accordance with an exemplary embodiment of the present disclosure.
Figure 8B:
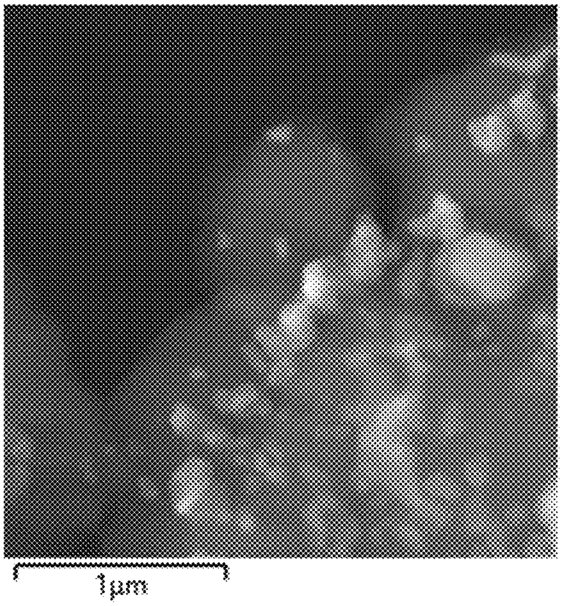
Figure 8C:
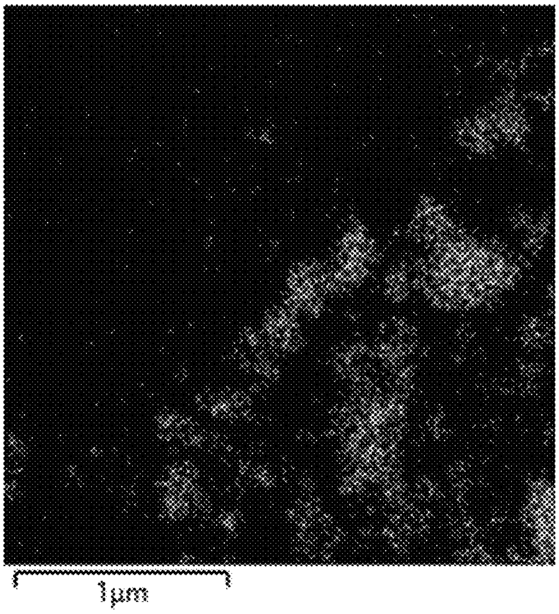
FIG. 8C is a corresponding EDX atom map of metal atoms of FIG. 8B, in accordance with an exemplary embodiment of the present disclosure.
Figure 20:
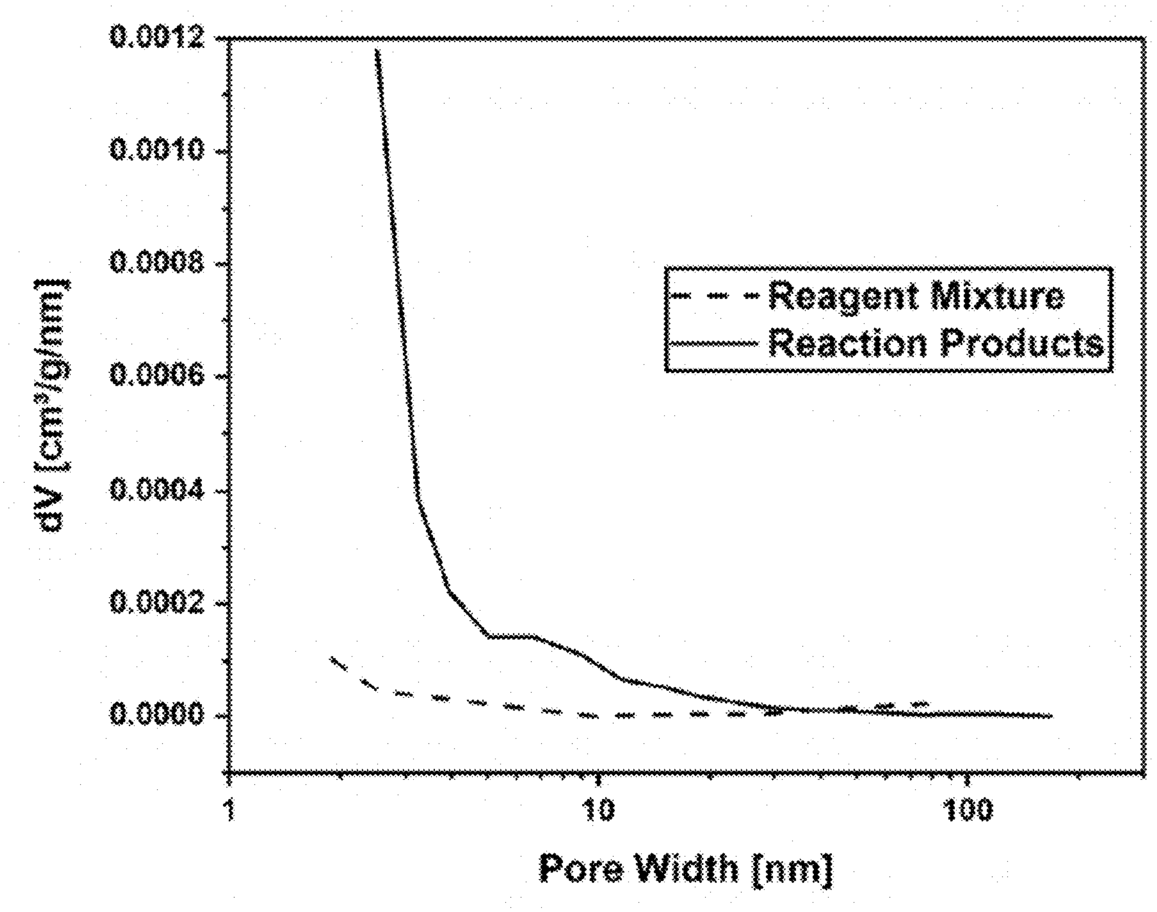
FIG. 20 is a plot demonstrating the change in pore size distribution of a polymer feedstock pre-reaction (dashed line) and a depolymerized polymer post-reaction (solid line) for reaction mixture identified in Table 1 as "PE-10," in accordance with an exemplary embodiment of the present disclosure.

A rather smooth surface of an MDPE particle with a coating of well-dispersed $Fe_2O_3$ was observed prior to the reaction (FIGS. 6A and 8A). However, the post-reaction SEM image of PE-10 (FIG. 6B) showed the agglomeration of numerous smaller particles with size of approximately 1 μm. This is attributed to the fragmentation of larger particles followed by recombination/re-agglomeration of the smaller fragments. The EDX spectrum show a limited amount of $Fe_2O_3$ on the outer surface (FIG. 7A), whereas TEM images (FIGS. 8A and 8B) show the presence of $Fe_2O_3$ particles inside the larger MDPE particle. The incorporation of $Fe_2O_3$ particles indicates that the process causes pronounced restructuring that should facilitate contacting parts of the PE particles that were formerly in the bulk with the catalyst and oxidant. $N_2$ physisorption (BET) analysis revealed a 10-fold increase in surface area after milling as well as the change in the pore size distribution with the more abundant mesopores (FIG. 20).

The particle size distribution (PSD) measured by dynamic light scattering (DLS) (FIG. 7B) show a shrinkage in particle size in PE-0, PE-5, and PE-10 (experiments where $H_2O_2$ is present), whereas for PE-M, the particles became larger, which indicates particle sintering. XRD patterns of PE-M (FIG. 21) reveal an increase in crystallite size from 26 nm to 33 nm, which further confirms a polymer sintering process. The sintering likely occurs when local temperature at the impact site increases above the melting point of PE (i.e., approximately 110° C.). This causes certain domains of the polymer to become more mobile and allows them to agglomerate. The crystallite sizes after PE-5 and PE-10 experiments were approximately 19 nm. The formation of interfaces between PE and $Fe_2O_3$ during the collisions prevents the growth of PE crystals.

Heterogeneous Fenton oxidation is known to occur at the interface between the solid $Fe_2O_3$ and liquid $H_2O_2$. It is thus plausible that the mechanical forces during collisions could generate a highly reactive solid-liquid interface that can activate the Fenton reaction upon contact with the surfaces of MDPE particles. The redistribution and fracturing of $Fe_2O_3$ particles (FIGS. 15A-19C) could result in the formation of nanoparticles and potentially promote leaching (Fe species exists in ion form in the liquid), meaning the catalytic activity of the system could include homogenous catalytic contributions.

Figure 9:
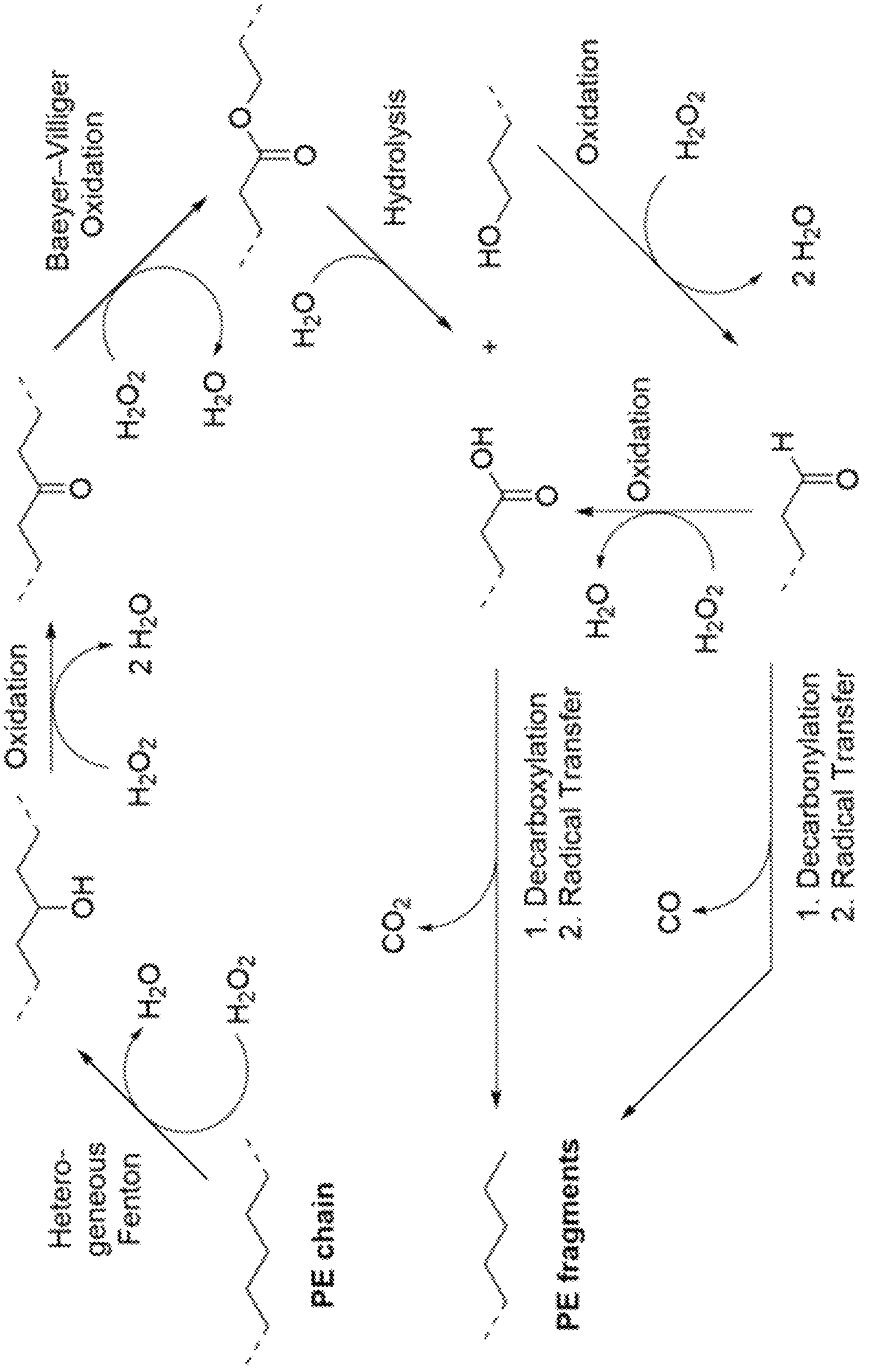
FIG. 9 provides a mechanism schematic of potential reaction paths of oxidative cracking of polymer feedstocks via the heterogenous Fenton process, in accordance with an exemplary embodiment of the present disclosure.
Figure 10A:
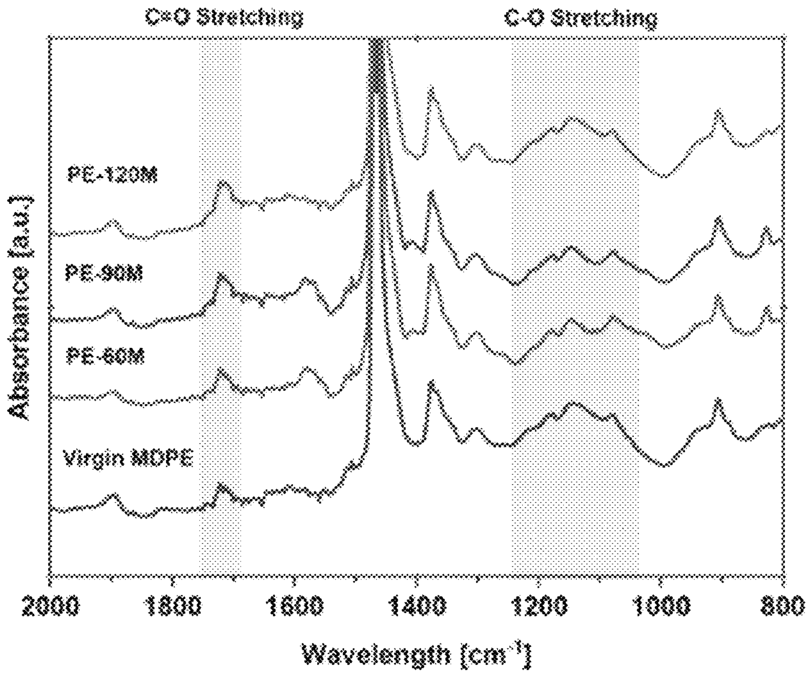
FIG. 10A is FTIR spectra of various example reaction mixtures, in accordance with an exemplary embodiment of the present disclosure.
Figure 10B:
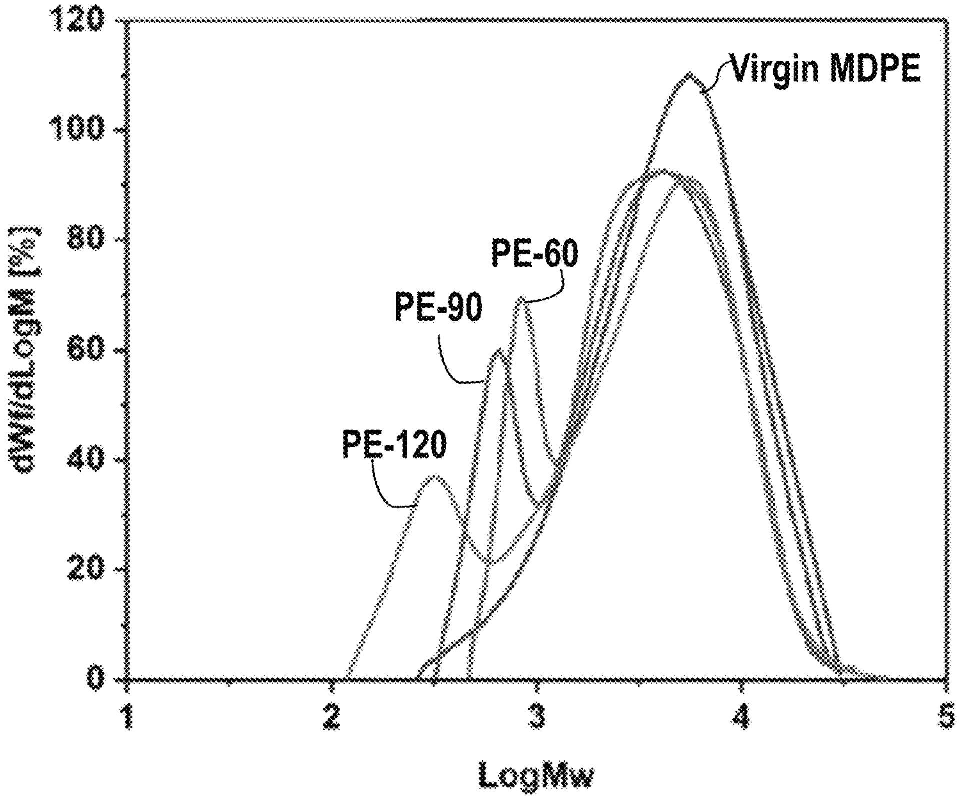
FIG. 10B is a plot of molecular weight distribution (MWD) determined by HT-GPC for various example reaction mixtures, in accordance with an exemplary embodiment of the present disclosure.

The observations described above point at a reaction path that comprises the oxidation of carbon atoms of the PE chain followed by a C—C bond scission reaction involving the affected carbon atom (FIG. 9). Specifically, the oxidation likely starts with formation of secondary alcohol group. A ketone group could be produced via the subsequent oxidation of this alcohol group. C—C bonds involving a keto group are prone to further oxidation to an ester by the Baeyer-Villiger oxidation with $H_2O_2$, which involves the cleavage of the original C—C bond. In the presence of water as well as protons and hydroxide ions from the Fenton/Haber-Weiss-cycle and the Lewis acid sites of the $Fe_2O_3$, an ester can be hydrolyzed forming a carboxylic acid and a terminal alcohol, which can be oxidized to an aldehyde or a carboxylic acid.

Figure 13C:
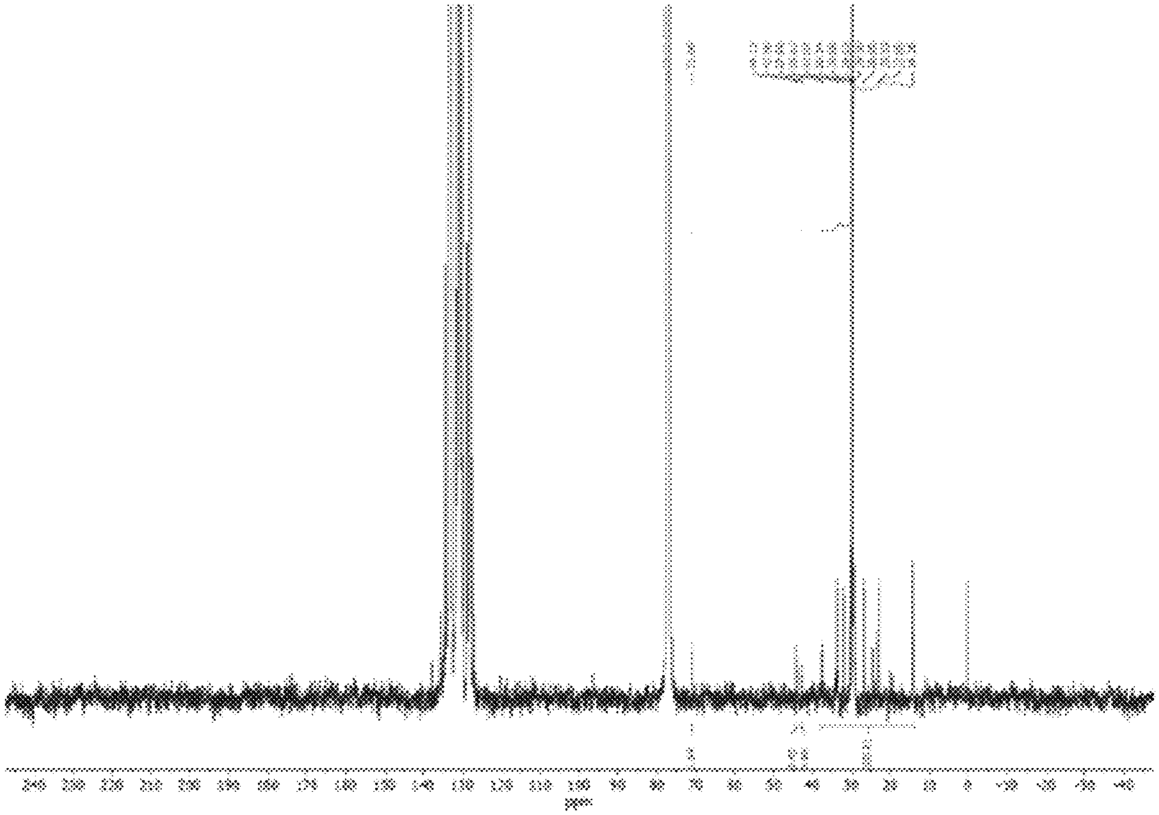
Figure 14A:
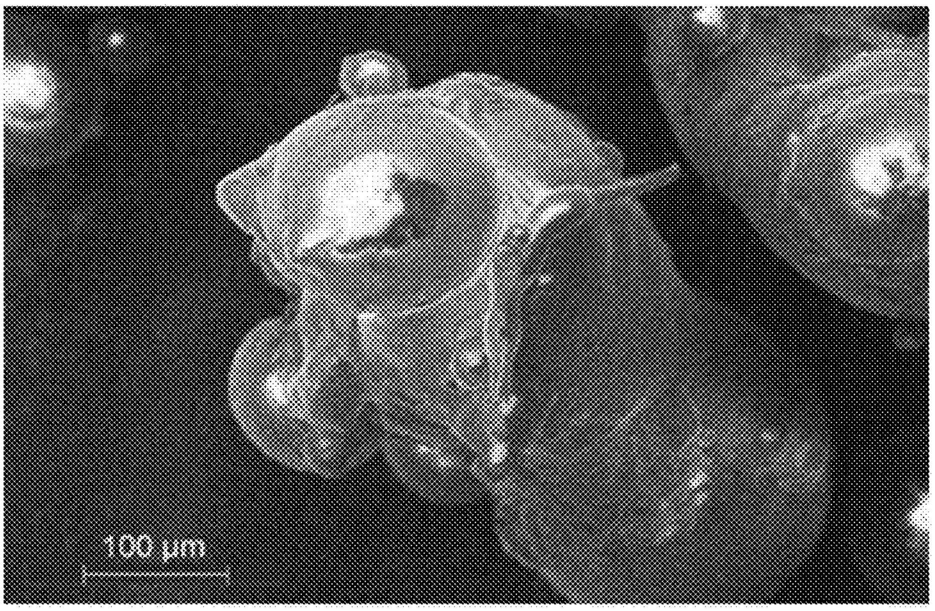
FIGS. 14A and 14B are SEM images of virgin depolymerized polymer powder identified in Table 1 as "Virgin MDPE", in accordance with an exemplary embodiment of the present disclosure.
Figure 14B:
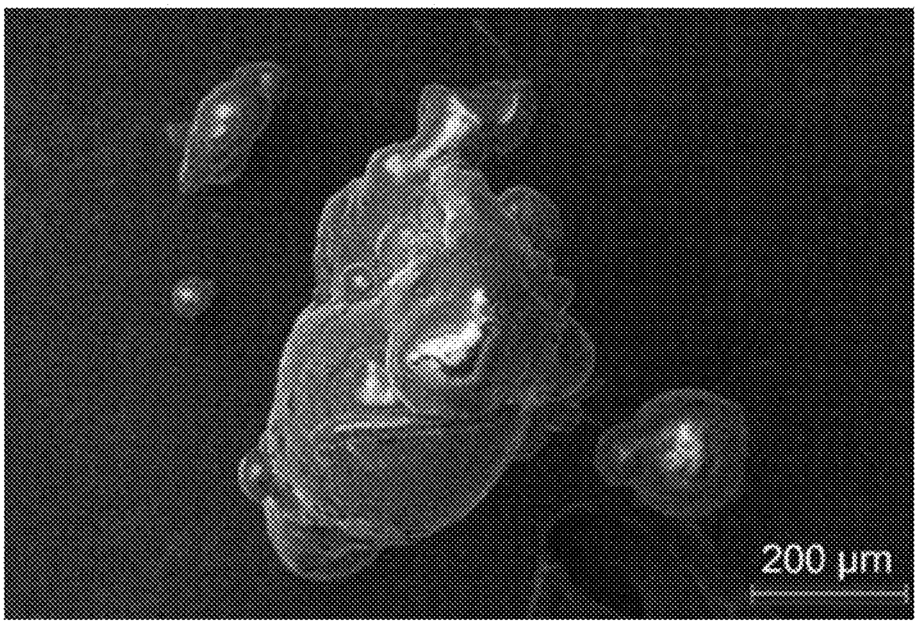
Figure 15A:
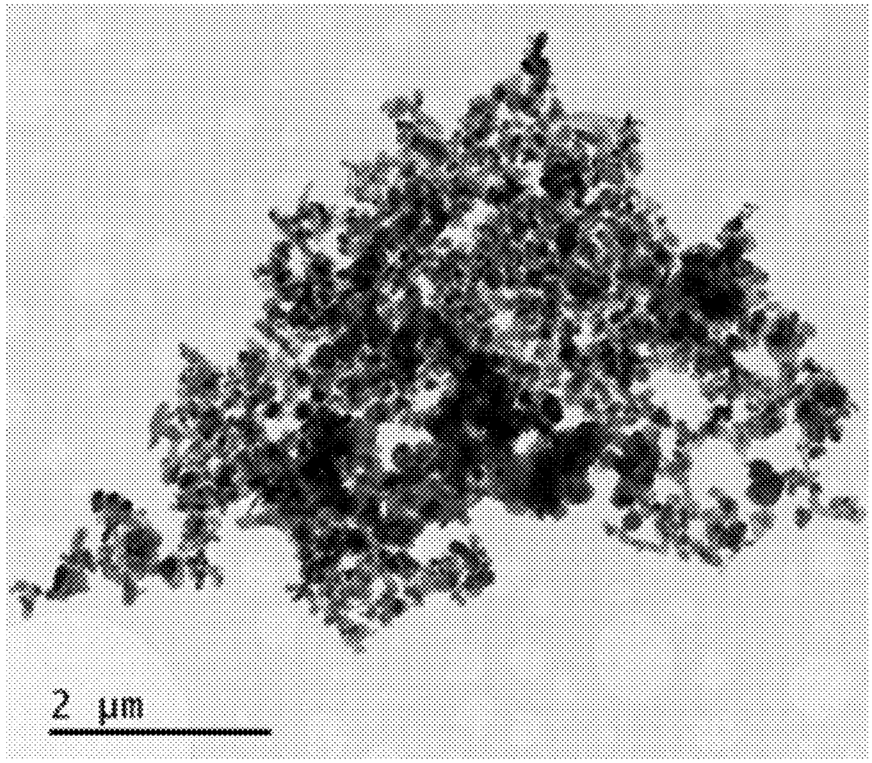
FIGS. 15A and 15B are TEM images of an example catalyst, in accordance with an exemplary embodiment of the present disclosure.
Figure 15B:
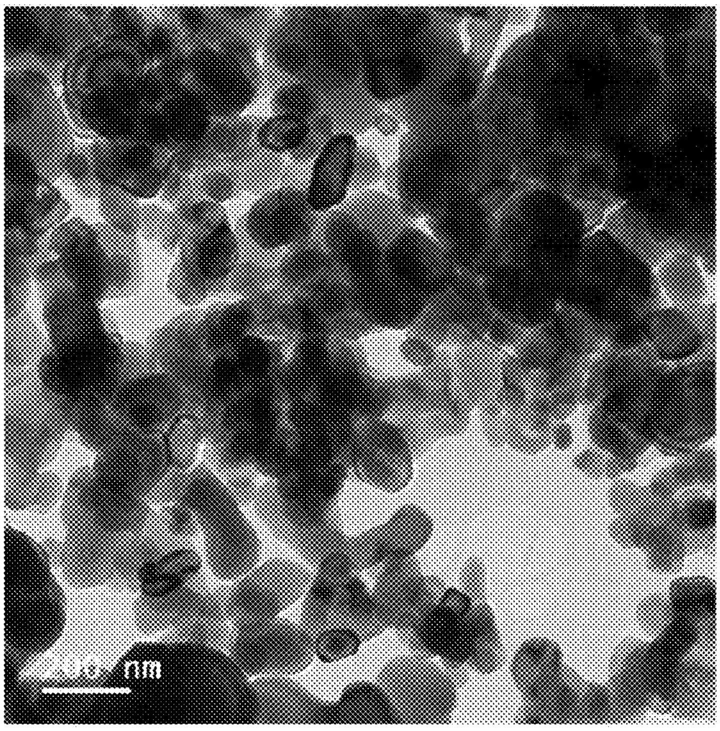
Figure 16A:
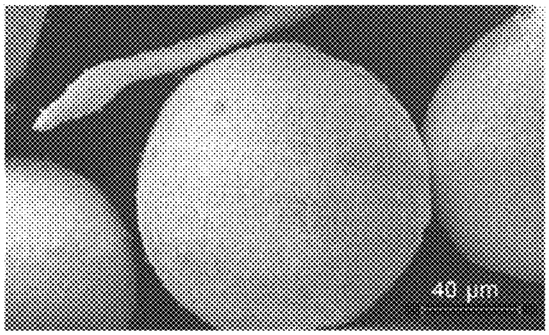
FIGS. 16A-16D provide an SEM image (FIG. 16A) and EDX-atom maps (FIG. 16B-16D) of a polymer feedstock pre-reaction for reaction mixture identified in Table 1 as "PE-10," in accordance with an exemplary embodiment of the present disclosure.
Figure 16B:
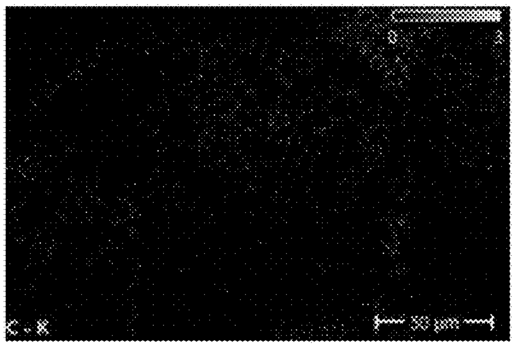
Figure 16C:
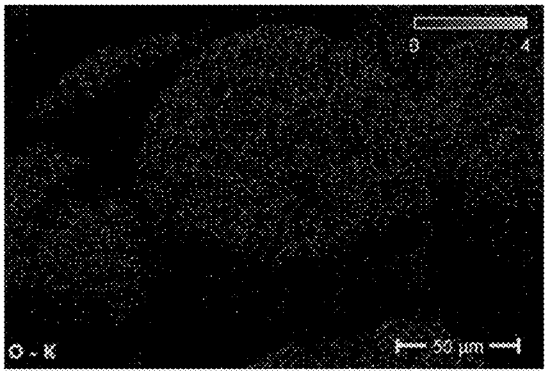
Figure 16D:
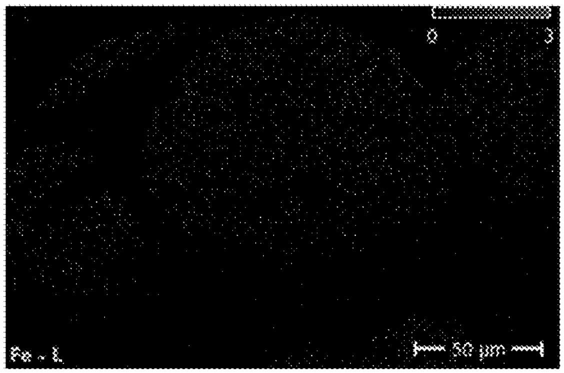

The GC-MS analysis of oligomers extracted in hexane suggested that oligomeric product fraction is dominated by species with alcohol, carboxylic acid, or methyl ester groups. The two separated chains with terminal functional groups could undergo decarboxylation or decarbonylation to remove the inserted oxygen atoms. While the limited yield of $CO_2$ and CO indicate that this is not the dominant reaction path at present, in may be possible to tune the system to provide deoxygenated products. Aliphatic carboxylic acids and acid anhydrides have been found to be decarbonylated to α-olefins over a cationic iron catalyst. In such reactions, the C(O)—O bond is cleaved to form a metal-acyl bond that promotes the removal of CO and $H_2O$ to form a terminal olefin species. However, $^{13}C$-NMR spectra of PE-5 and PE-10 do not indicate the presence of the C═C bond (FIGS. 13B, 13C). Iron porphyrins were found to catalyze the decarbonylation of $C_n$-aliphatic aldehyde to yield $C_{n-1}$-alkane via an acyl-metal intermediate that can be decarbonylated yielding an alkyl radical that can perform a radical transfer. Direct decarbonylation of ketones has also been reported with similar transition metal cations (Rh, Ru, Pd, and Ni), however, it is unlikely that an unstrained aliphatic ketone in this case could be decarbonylated without chelation assistance. In addition, the decarboxylation of carboxylic acid over iron catalyst forming $CO_2$ to yield an alkane has been observed in literature. Cooper et al. proposed a Kolbe type of reaction mechanism where an alkyl radical is formed as an intermediate to an alkane. In such process, an $Fe^{3+}$ species can function as an electron receptor that receives one electron from the carboxylate ion to form an acylate radical that results in the subsequent evolution of $CO_2$ and an alkyl radical.

In summary, a novel approach to solvent-free mechanocatalytic cracking of PE is demonstrated, in which a heterogeneous Fenton process may be employed. By randomly oxidizing carbon atoms in the PE chain, the polymer can be activated for cracking, and straight-chain oxygenates with significantly lower molecular weight are obtained. Hydrolysis of ester intermediates appears to play a role in the cracking process, while decarbonylation and/or decarboxylation contribute to the formation of limited quantities alkanes and $CO_2$/CO. While the process forms $CO_x$ as a by-product, a limited fraction of PE would have to be oxidized to break down PE to an industrially relevant hydrocarbon stream and that the oxidation reactions can provide the necessary thermodynamic driving force for PE cracking process. This work demonstrates an innovative process in which an inert and stable polymer species can be functionalized with oxygen-based groups that weaken adjacent C—C bonds. Then, these weakened C—C bonds to fragment the polymer in a solvent-free manner with minimal by-product generation. The produced oligomers could serve as a feed for current available petroleum processing facilities to be further converted to useful products.

Example 1—Experimental Setup

The mechanocatalytic cracking experiment was conducted using a Retsch MM400 vibratory mixer mill in a 25 ml Φ=20 mm capsule milling vessel (FIGS. 2A and 2B). The reaction wall was made of stainless steel and had a gas outlet with the diameter of @=6 mm. The balls used in this experiment were made of stainless steel as well. The two parts of the milling vessel were sealed with thread and a Viton O-ring. At the gas outlet, a steel membrane was attached to an Φ6/Φ2-adapter then to a Φ=2 mm PVC hose, which provides flexibility while milling. The Φ=2 mm PVC hose was connected to 6 mm fixed metal tubing with a 3-way-valve. The lower outlet was not connected and served as a connection to the micro GC for gas analysis, while the upper outlet was connected to a U-shaped Φ=6 mm metal tubing that leads to a 100 ml three-necked round-bottom flask filled with a 0.027 M $Ca(OH)_2$ solution with one neck sealed. The other neck's cork was penetrated with 20-gauge needle allowing a minimal gas venting.

Example 2—Materials

Polyethylene: Medium-density polyethylene (MDPE) powder was supplied by Sigma-Aldrich.

Ferric Oxide: Ferric oxide $Fe_2O_3$, (or iron (III) oxide) powder was purchased from Avantor Performance Material US with the trade name Ferric Oxide, BAKER Analyzed® Reagent Hydrogen peroxide solution: The hydrogen peroxide solution used in the scope of this work had a concentration of 30 wt. % hydrogen peroxide solution in water with 0.5 ppm stannate containing compounds and 1 ppm phosphorus-containing compounds as stabilizers, supplied by Sigma-Aldrich.

Example 3—Experimental Procedure

All parts of the reaction vessel were cleaned and dried before each experiment. Milling balls were firstly placed into the into the bottom half of the vessel. Subsequently, the desired amount of PE powder and $Fe_2O_3$ was weighed separately and poured into the bottom part as well. The desired amount of hydrogen peroxide solution was pipetted out of its containment bottle into a scintillation vial and then transported into the bottom half via pipetting. A Viton O-ring was then inserted into the designated groove in the cap, before the two parts could be sealed together and inserted into the MM400. The gas outlet was quickly secured and tightened afterward to prevent volatile gasses from escaping without being measured. For all the performed experiments, ambient air was used as the headspace gas.

Once the milling was done, the volatile products were to be analyzed, either qualitatively with the lime water gas test or quantitatively with the Micro GC. The milling vessel was weighed to determine the amount volatile products evolved during the experiment.

The reaction mixture was retrieved and transported to a scintillation vial. Since the process included milling in an aqueous solution, the amount of water in the reaction mixture was substantial. For the sake of analytics, the vial with the reaction mixture was stored in closed oven away from visible light, whose temperature is set at T=103° C. for 3-4 hours. After all the excess water was removed, the samples were analyzed.

Both parts of the vessel, the milling balls and the O-ring were sonicated under a soapy water solution to remove all of the remaining powder for 30 minutes. All parts were rinsed once more time with water. The milling balls, the bottom and the cap of the vessel were dried in a 103° C. convection oven, whereas the Viton O-ring was left for drying at room temperature.

Example 4—Reaction Parameters of Example Experiments

TABLE 3

Example reaction parameters

| Experiment | MPE [g] | $M_{H2O2\ 30\ wt.\ \%}$ [g] | $M_{Fe2O3}$ [mg] | Balls | Frequency [Hz] | Milling time [min] |
|---|---|---|---|---|---|---|
| PE-M | 1 | 0 | 0 | 8 × 10 mm | 25 | 90 |
| PE-0 | 1 | 1 | 0 | 8 × 10 mm | 25 | 90 |
| PE-5 | 1 | 1 | 50 | 8 × 10 mm | 25 | 90 |
| PE-10 | 1 | 1 | 100 | 8 × 10 mm | 25 | 90 |
| PE-15H | 1 | 1 | 50 | 8 × 10 mm | 15 | 90 |
| PE-20H | 1 | 1 | 50 | 8 × 10 mm | 20 | 90 |
| PE-60M | 1 | 1.5 | 50 | 8 × 10 mm | 25 | 60 |
| PE-90M | 1 | 1.5 | 50 | 8 × 10 mm | 25 | 90 |
| PE-120M | 1 | 1.5 | 50 | 8 × 10 mm | 25 | 120 |

Example 5—Attenuated Total Reflectance Fourier-transform Infrared Spectroscopy (ATR-FTIR)

The IR spectra of the reaction mixture were measured with the Thermo Scientific™ Nicolet™ 8700 FTIR spectrometer equipped with Smart iTR™ Attenuated Total Reflectance (ATR) sampling accessory with a diamond/ZnSe crystal. A small amount of sample was inserted into the designated sampling unit of the ATR with a spatula. For each sample, the FTIR spectra were taken at least twice.

Example 6—Carbon-13 Nuclear Magnetic Resonance ($^{13}$C-NMR)

The liquid-state NMR analysis with $CDCl_3$ or Chloroform-d as a solvent of the samples was carried out with the Bruker Avance III HD 700 MHZ NMR Spectrometer. Approximately 100 mg of the dried reaction mixture was weighed into a 16 mm×125 mm borosilicate culture tube with a magnetic stirring bar. Approximately 1 mL of 1,2,4-trichlorobenzene (1,2,4-TCB) was added into the tube with a syringe. Subsequently, the tube was placed in a temperature-regulated oil bath of 165° C. for 3 h. Afterwards, the whole solution, which at this point was still at elevated temperature, was pipetted into a 3 mL syringe equipped with a filter disc of size 0.2 μm. The solution was filtered into a 3 mL vial to remove all residual iron oxide. Thereupon, the solution was then cooled to room temperature. Approximately 500 μL of the solution was extracted with a Pasteur pipet into an NMR tube. The pipet was then flushed with approximately 500 μL of $CDCl_3$. The measurement was carried out with the value of D1=20 s, because of the meaningful measurement time and accuracy with each measurement containing 512 scans with regular decoupling.

Example 7—High-Temperature Gel Permeation Chromatography (HT-GPC)

The Malvern Viscotek HT-GPC system was used to determine the number average molecular weight (Mn), the weight average molecular weight (Mw), and the polydispersity index (PDI) as well as molecular weight distribution of the samples. The system was calibrated with a polystyrene universal standard. The system consisted of three CLM6210 mixed-bed HT-GPC columns with a triple detector array including a differential refractive index (RI) detector, a right angle (90°) and low angle (7°) light scattering detector and a viscometer detector. The temperature of the column as well as the detector was set at 150° C. The injection volume was 200 μL. The flow rate through the system was set at 1 mL/min. Roughly 35-45 mg of the solid samples were in dissolved at 140° C. in 15 ml 1,2,4-TCB for at least 3 hours under constant stirring. Thenceforth, the solution was removed and filtered through a syringe equipped with a filter disc of size 0.2 μm to remove all of the undissolved solid oxide. Subsequently, the sample was placed in the autosampler system of the HT-GPC, where it remained heated until injected onto the column.

Example 8—Dynamic Light Scattering Particle Size Analyzer (DLS)

The Brookhaven 90plus Particle Size Analyzer dynamic light scattering system was employed to determine the particle size distribution of the solid samples. Approximately 20 mg of solid samples were dispersed in 3 mL of methanol (MeOH) using a 15 ml centrifuge tube in a vortexer. Approximately 2 mL of the suspension was then pipetted into a 4.5 mL plastic cuvette before being inserted into the laser chamber.

Example 9—Micro Gas Chromatograph (Micro GC)

The gas analysis was performed with the Agilent 490 Micro GC System equipped with four columns and two carrier gases: MS5A/Ar, MS5A/He, PPU/He, $Al_2O_3$/KCl/He. The system was calibrated with a universal calibration gas purchased from Agilent. The composition of the calibration is listed in Table 4. After the milling was finished, the milling vessel and the 3-way-valve, as well as the connections between them (the PVC tube, gas outlet, filter, adapter), were removed from the MM400 while staying intact and were connected to the Micro GC using the lower outlet of the 3-way-valve. The valve was connected to a pressure relief chamber setup that was stuffed with cotton wool that helped reduce the pressure to the level susceptible to Micro GC and removed all condensed liquid droplets that could damage the columns. The valve was connected to a pressure relief chamber setup that helped reduce the pressure to the level susceptible to Micro GC and removed all condensed liquid droplets that could damage the columns. The chamber was evacuated beforehand to assure the most precise estimation of the gas composition. The 3-way valve was opened to let the gas flow into the chamber. After reaching the relative pressure of p=5 psi in the relief chamber, the connection to the Micro GC was opened and the composition of the gas was then analyzed.

TABLE 4

Example compositions of the universal calibration gas.

| Gas | Concentration |
|---|---|
| Helium | 0.102% |
| Neon | 0.0510% |
| Hydrogen | 0.102% |
| Nitrogen | 0.105% |
| Methane | Balance |
| Ethane | 0.0521% |
| Ethylene | 0.0491% |
| Carbon Dioxide | 0.0510% |
| Carbon Monoxide | 0.0988% |
| Acetylene | 0.0491% |
| Propane | 0.0486% |
| Methyl Acetylene | 0.0487% |
| n-Butane | 0.0486% |
| n-Hexane | 0.0502% |
| n-Heptane | 0.0482% |
| Water content ($H_2O$) | <5 ppm |
| Oxygen | 0.0513% |
| Other Impurities (HC's) | <1 ppm |

Example 10—X Ray Diffraction (XRD)

The XRD analysis of the samples was conducted using the Panalytical XPert PRO Alpha-1 XRD. X-ray source is a Copper K-α with a wavelength of 1.54 Angstroms. Between 0.3 and 0.5 g of the samples were used for XRD measurement.

Example 11—Scanning Electronic Microscope (SEM), Transmission Electronic Microscope (TEM) and Energy-Dispersive X-Ray Spectroscopy (EDX)

In this Study, the Morphological Properties of all Powder Species were Studied by analyzing the SEM- and TEM-images. An EDX analysis was performed subsequently to investigate the chemical composition of the solid subject. The SEM-EDX and TEM-EDX analysis was performed with the Thermo Axia Variable Pressure SEM and FEI Tecnai F30 TEM. For the SEM-EDX analysis, a small amount of sample was dispersed on the available sample holders, whereas for TEM-EDX, the solid sample was first dispersed in ethanol and deposited on the TEM grid. The grid with the samples is then dried at room temperature for at least 12 hours before the image investigation can proceeded.

Example 12—Oligiomer Extraction Using Hexane Probed with Gas Chromatography-Mass Spectrometry (GC-MS)

Figure 22:
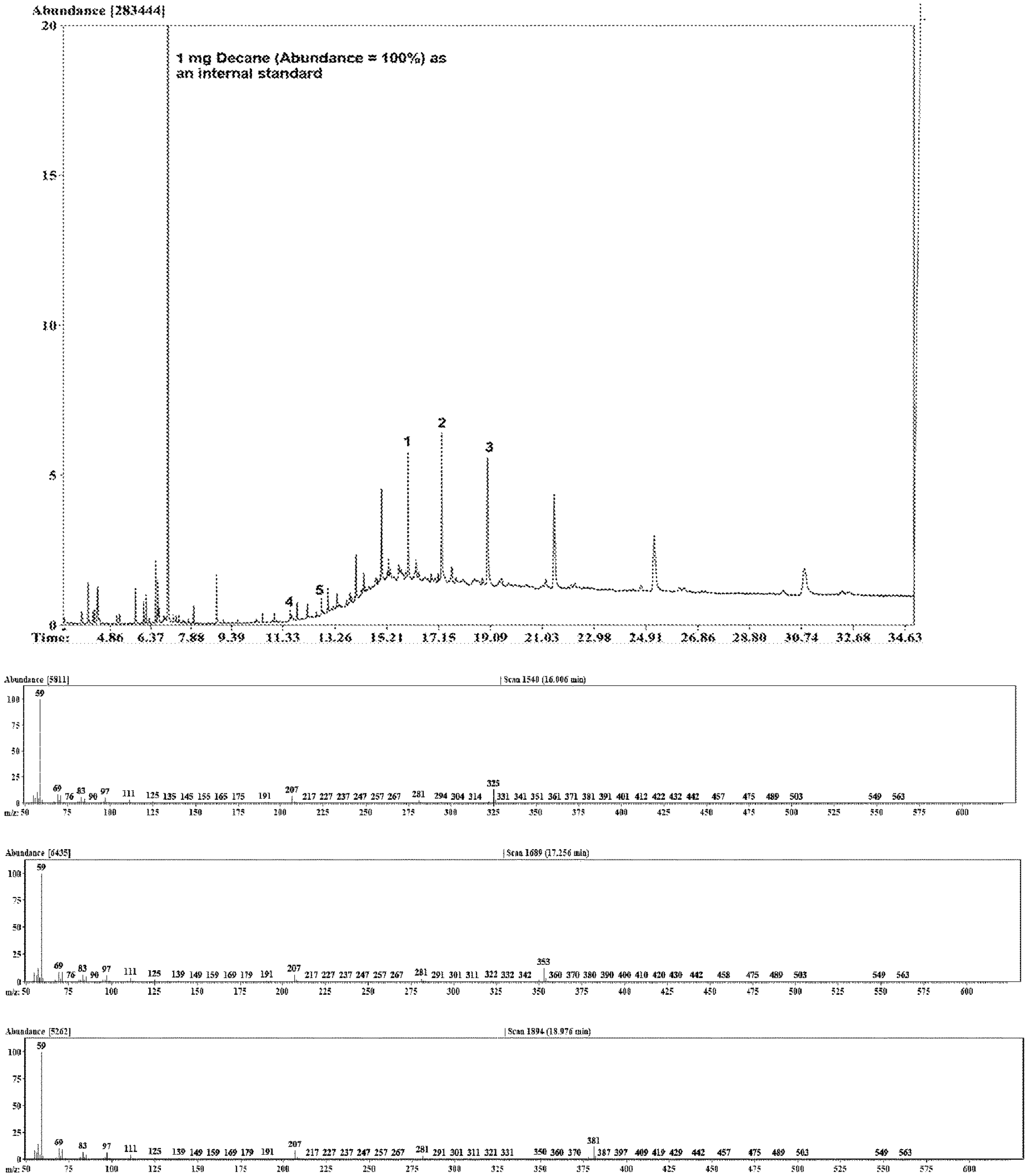
FIG. 22 provides a gas chromatogram of washed solution of depolymerized polymer (top) and mass-spectrometry spectra of peaks 1, 2, and 3, respectively from top to bottom, in accordance with an exemplary embodiment of the present disclosure.

The HT-GPC results illustrated in FIG. 5B indicated the presence of oligomeric products along with residual polymer. To identify specific products, the MDPE was extracted with hexane. Approximately 1 g of original MDPE was stirred overnight in 1 ml hexane. The solid polymer was then retrieved and washed again in 1 ml hexane overnight at room temperature. The wash solution was then retrieved and analyzed by GC-MS using an Agilent 8890 GC equipped with HP-5 MS UI capillary column coupled to a 5977B GC/MSD operating on electron impact mode. A helium gas flow of 1 ml/min was used as the carrier gas. The GC chromatogram illustrated in FIG. 22 showed a very weak presence of any products that were soluble in hexane.

The PE-10 extracted in a similar way using the following parameters: 1 g MDPE, 1 g $H_2O_2$ (aq) 30 wt. %, 100 mg $Fe_2O_3$. After the reaction, approximately 1 g of dried reaction product mixture was stirred overnight in 1 ml hexane at room temperature. The same GC-MS analysis was performed.

Example 13—Variation of Milling Times

The influence of the milling times is investigated using the FTIR and HT-GPC techniques. The milling times (60, 90, and 120 minutes) (PE-60M, PE-90M, and PE-120M in Table 1, respectively), are to be varied. In PE-60M, PE-90M, and PE-120M, the loading of the $H_2O_2$ solution was increased to 1.5 g to study the influence of the liquid oxidant loading as well as to avoid the depletion of $H_2O_2$ during the reaction progress.

The distinct bimodal molecular weight distribution was also observed in this case, with a more abundant fraction of lighter products with the increasing milling times. Meanwhile, the same FTIR spectra contained the same characteristic bands of C—O at around 1700 $cm^{-1}$ and C—O in the area between 1000 and 1200 $cm^{-1}$.

Example 14—Variation of Milling Frequencies

A similar bimodal MWD was observed with different milling frequencies. The milling frequency affected the product distribution in a more complex way than the milling time with a milling frequency of 20 Hz (PE-20H) yielding the lightest oligomers. The oligomer yield, illustrated by the intensity of the dWf/d Log M distribution, appears to be roughly the same for different milling frequencies. The same characteristic IR peaks were observed for all samples.

Figure 11A:
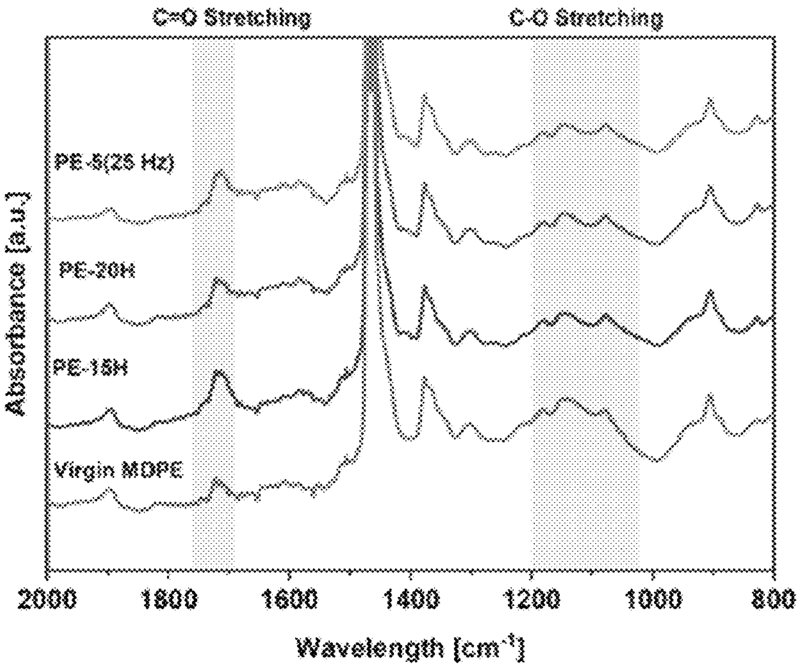
FIG. 11A is FTIR spectra of various example reaction mixtures, in accordance with an exemplary embodiment of the present disclosure.
Figure 11B:
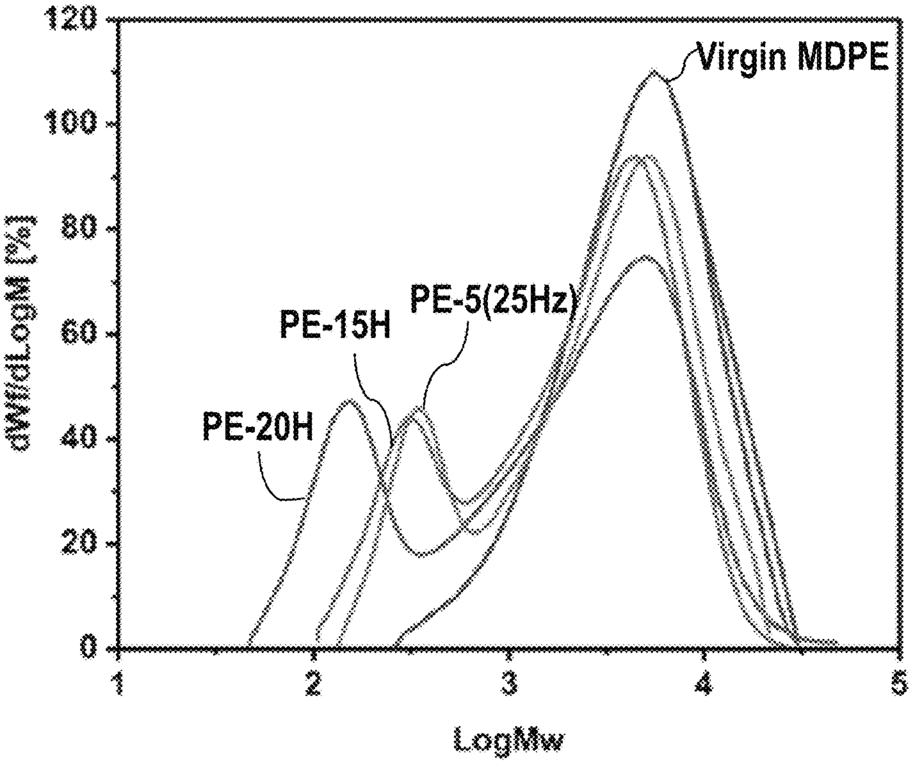
FIG. 11B is a plot of molecular weight distribution (MWD) determined by HT-GPC for various example reaction mixtures, in accordance with an exemplary embodiment of the present disclosure.

Example 15—Analysis of Oxidation of Poly(ethylene) via $^{13}$C-NMR Spectroscopy The $^{13}$C-NMR spectra, peak list, and integration values of the virgin MDPE and MDPE samples in Experiment PE-M, PE-0, PE-5, PE-10 are shown in FIGS. 12A-11C.

In the NMR spectrum of the virgin MDPE powder (FIG. 12A), peaks corresponding to oxygen-based functional groups were observed. These could originate from either photooxidation due to exposure to UV light or the presence of oxygen-containing antioxidants, such as butylated hydroxytoluene (BHT) or Irganox 1-1010, 1-3114, which function as radical scavengers. However, the increased intensity in the spectra of PE-5 and PE-10 suggests that additional oxygen atoms were incorporated into PE-backbone during the Fenton process.

Example 16—Qualitative Determination of $CO_2$ Presence in the GAS Stream in Different Experiments The qualitative determination detection of $CO_2$ was performed by venting the gas exiting the gas outlet to a $Ca(OH)_2$ 0.027 M lime water solution test. A white precipitation was visible in experiment PE-5 and PE-10, indicating the presence of $CO_2$ in the gas stream.

Example 17—Study of Macroscopic and Morphological Changes

SEM and TEM images of samples taken from the virgin MDPE, the $Fe_2O_3$ powder feedstock, and samples from different experiments showed the macroscopic and morphological changes that took place during the reaction.

The virgin MDPE powder existed in both spherical and capsule shape with a smooth surface. The TEM images showed the agglomeration of nanosized $Fe_2O_3$ particles. When mixed together, the nanosized $Fe_2O_3$ has shown to be well-dispersed over the surface of the larger MDPE particle. FIGS. 16A-16D show an MDPE particle prior to the reaction in experiment PE-10 as well the corresponding atom map. SEM images from experiment PE-M, PE-0), PE-5, PE-10 were taken to compare the morphological changes in each experiment.

Figure 17A:
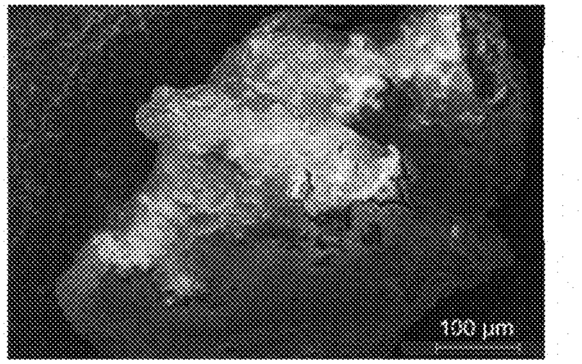
FIGS. 17A-17H are SEM images of depolymerized polymer for various reaction mixtures identified in Table 1 as "PE-M" (FIGS. 17A and 17B), "PE-0" (FIGS. 17C and 17D), "PE-5" (FIGS. 17E and 17F), and "PE-10" (FIGS. 17G and 17H), in accordance with an exemplary embodiment of the present disclosure.
Figure 17B:
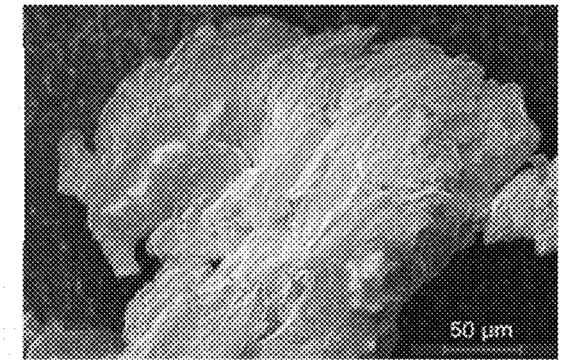
Figure 17C:
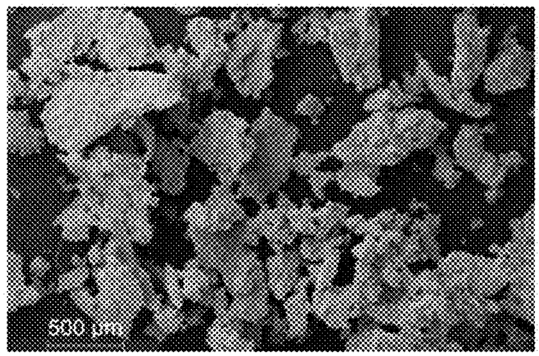
Figure 17D:
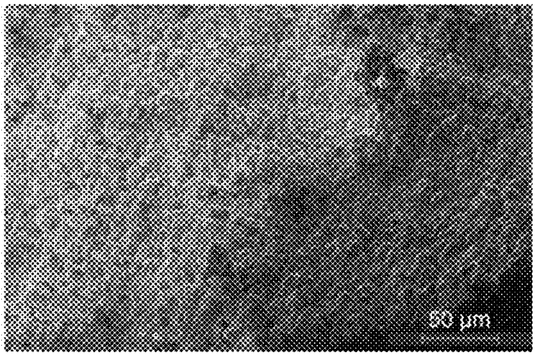
Figure 17E:
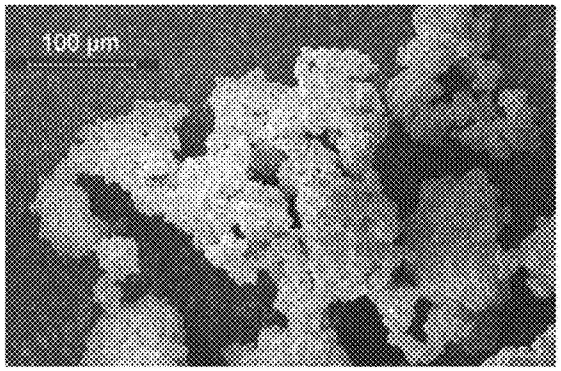
Figure 17F:
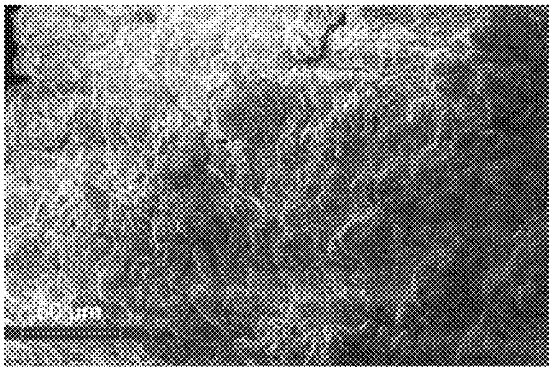
Figure 17G:
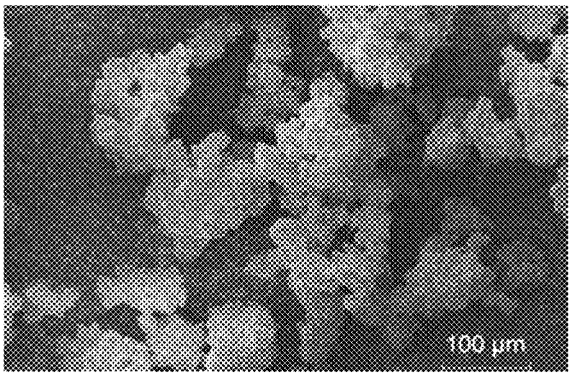
Figure 17H:
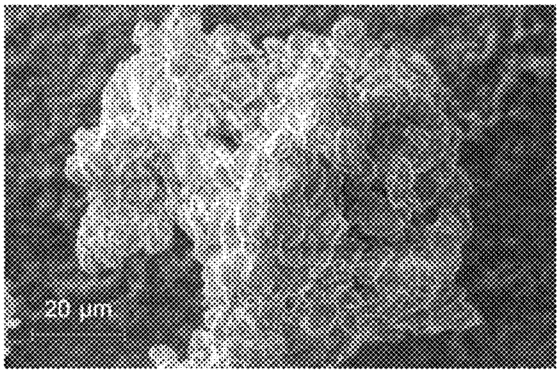
Figure 18A:
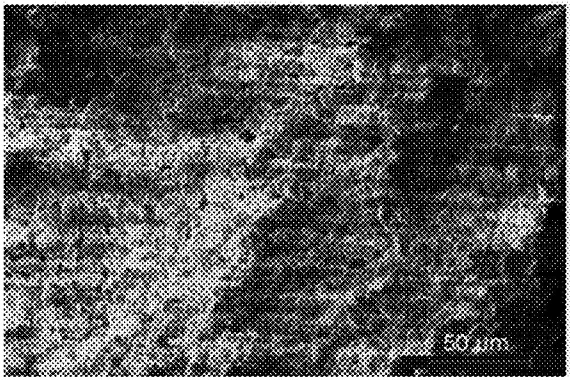
FIGS. 18A-18D provide an SEM image (FIG. 18A) and EDX-atom maps (FIG. 18B-18D) of a depolymerized polymer post-reaction for reaction mixture identified in Table 1 as "PE-10," in accordance with an exemplary embodiment of the present disclosure.
Figure 18B:
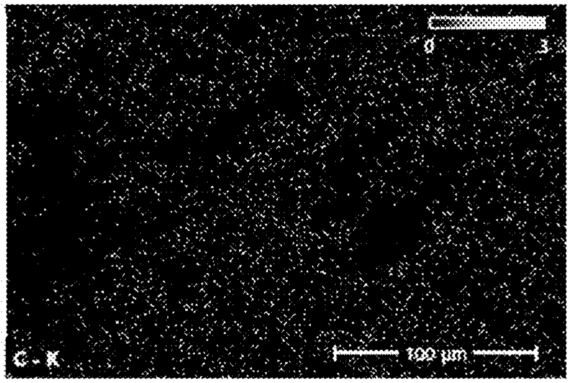
Figure 18C:
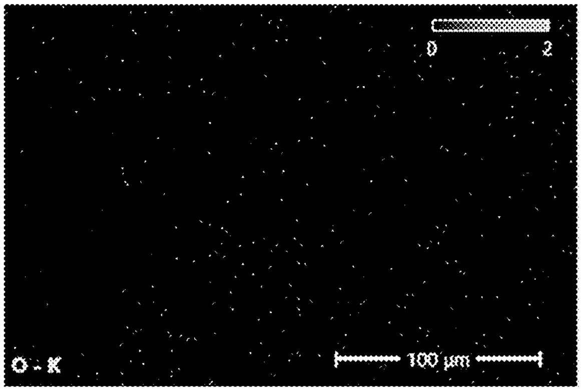
Figure 18D:
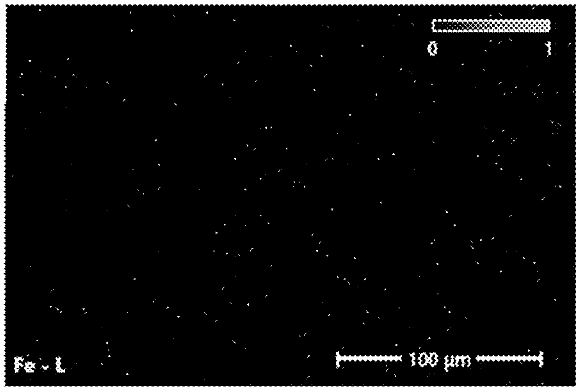
Figure 19A:
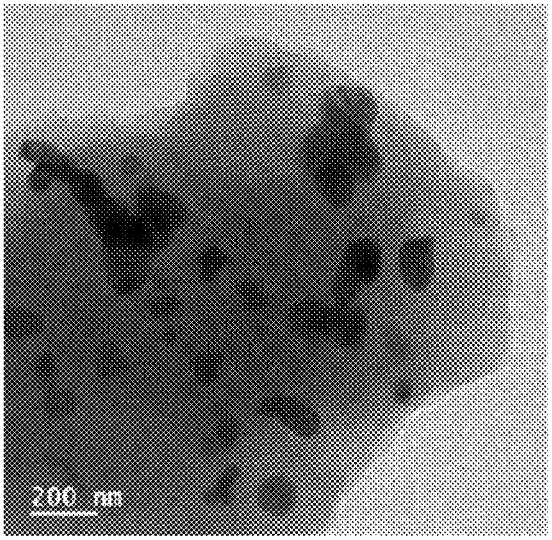
FIGS. 19A-19C are TEM images of a depolymerized polymer post-reaction for reaction mixture identified in Table 1 as "PE-10" showing dispersion of an example catalyst, in accordance with an exemplary embodiment of the present disclosure.
Figure 19B:
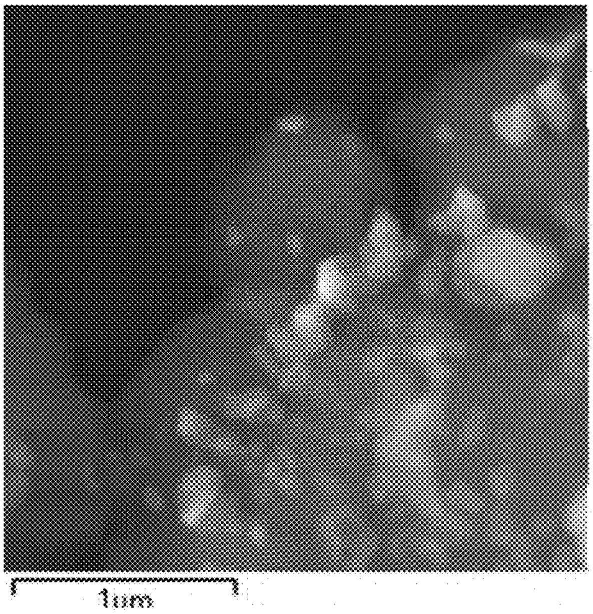
Figure 19C:
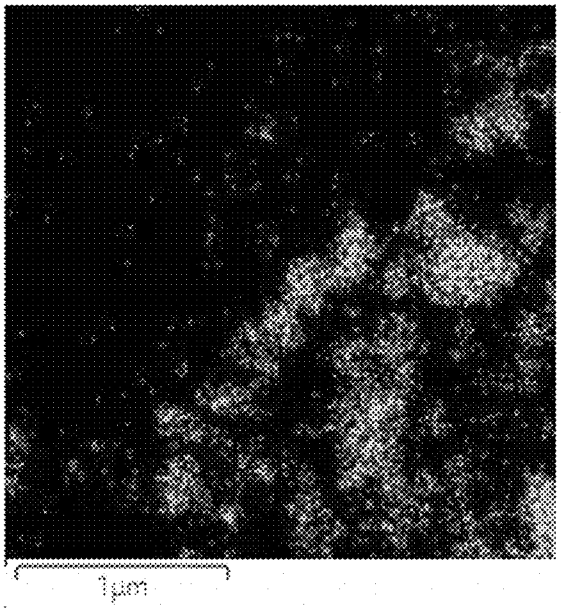

FIG. 17A could illustrate the sintering process of two MDPE particles. The surface of the particle seems to have changed dramatically, from a smooth to a rather rough surface (see FIG. 17B). The appearance of surface defects was detected in PE-0, PE-5, and PE-10 (see FIGS. 17D, 17F, 17H). This could indicate a surface interaction between the MDPE and the highly oxidative $H_2O_2$. In regards to the morphology, the shape of the particles changed significantly after the process. Namely, it seems to have undergone the process of particle shattering with the total absence of the original capsule and spherical form. An atom map was crafted for a post-reaction particle from experiment PE-10 to see the changes in the dispersion of $Fe_2O_3$. This is illustrated in FIGS. 18A-18D.

Example 18—Surface Analysis

With the observable changes in the particle morphology and surface, the overall surface area was expected to increase. Table 5 shows the surface area of the virgin MDPE, $Fe_2O_3$, reagent mixture and reaction products of experiment PE-10.

TABLE 5

Example BET surface area of the virgin MDPE and $Fe_2O_3$ powder feedstock as well as reagent mixture and reaction products of experiment PE-10.

| Powder Species | BET-Surface Area [$m^2/g$] |
| --- | --- |
| Virgin MDPE | 2.47 |
| $Fe_2O_3$ | 8.31 |
| PE-10 Reagent Mixture | 1.83 |
| PE-10 Reagent Products | 17.48 |

The surface area of the virgin MDPE and $Fe_2O_3$ powder indicated a rather non-porous material surface for both species. The surface area of PE-10 was significantly higher after reaction. This could be attributed to the change in morphology and surface properties.

The change in pore size distribution through the reaction was also investigated. This is demonstrated in FIG. 20. The results showed that the process seems to have introduced a substantial number of mesopores in MDPE.

Example 19—XRD Patterns

Figure 21:
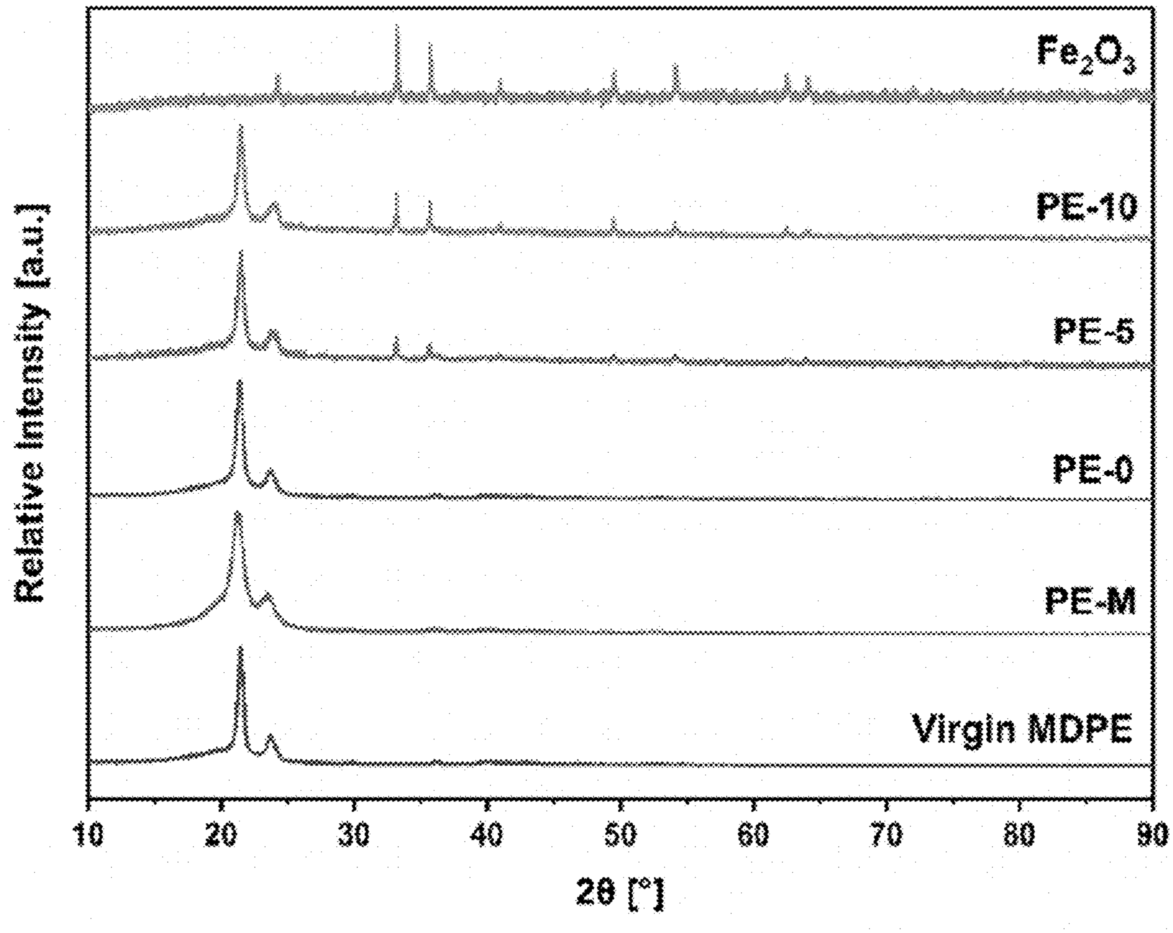
FIG. 21 provides X-ray diffraction patterns of powders collected from virgin polymer feedstock, various reaction mixtures, and catalyst, in accordance with an exemplary embodiment of the present disclosure.

FIG. 21 shows XRD of the virgin MDPE, $Fe_2O_3$ powder and the sample from experiment PE-M, PE-0, PE-5 and PE-10.

The Scherrer equation was employed to calculate the crystallite size of MDPE powder after the reaction. The chosen value of 2θ was 2θ=21.5°, which corresponds to the (110) reflection of the polymer crystal. The Scherrer equation can be written as Equation 1:

$$D = \frac{K\lambda}{\beta\cos\theta} \tag{1}$$

Where D is the mean size of the crystallite in nanometers (nm), K is the shape factor (approximately 0.9 a.u.), β is line broadening at half the maximum intensity (FWHM) (after subtracting the instrumental line broadening), and θ is the Bragg angle.

The values of β as well as the crystallite size D of the virgin powder and after each experiment are demonstrated in Table 6.

TABLE 6

PE crystallite size of the virgin powder and after experiment PE-M, PE-0, PE-5, and PE-10

| Experiment | β [rad] | D [nm] |
| --- | --- | --- |
| Virgin MDPE | 0.00534 | 26.42 |
| PE-M | 0.00427 | 33.01 |
| PE-0 | 0.00320 | 44.03 |
| PE-5 | 0.00783 | 18.02 |
| PE-10 | 0.00712 | 19.82 |

Example 20—Determination of Gas Yield

Based on the gas concentration given by the gas analysis, the calculation of the gas yield is estimated using the Dalton's law of partial pressure, which is expressed in Equation 2:

$$p_{total} = \sum_{n=i}^{n} p_i = p_{total} \cdot \sum_{n=i}^{n} y_i \tag{2}$$

Where p is pressure (Pa) and y is gas concentration (a.u./mol %).

Since the headspace gas used in all experiments was ambient air containing oxygen, the gas composition inside the reaction vessel was determined before and after the reaction using the MicroGC at room temperature. The difference in the $O_2$ concentration was attributed to $O_2$ formation in the process. Because of its inertness, the amount of nitrogen ($N_2$) can be said to remain unchanged and the partial pressure of $N_2$ should remain constant, which gives:

$$p_{N_2} = p_{N_2,before} = p_{N_2,after} =$$

$$p_{total,before} \cdot y_{N_2,before} = p_{total,after} \cdot y_{N_2,after} \rightarrow p_{total,after} = p_{total,before} \cdot \frac{y_{N_2,before}}{y_{N_2,after}}$$

Where the values of $y_{N_2,before}$ as well as $y_{N_2,after}$ are given by the gas analysis. At the same time, the mol value of gas is estimated using the ideal gas law.

Which gives $$n_{total,before} = \frac{p_{total,before}V}{RT}$$

$$n_{total,after} = \frac{p_{total,after}V}{RT}$$

As well as $$n_{i,before} = \frac{p_{i,before}V}{RT} = \frac{y_{i,before} \cdot p_{total,before}V}{RT}$$

$$n_{i,after} = \frac{p_{i,after}V}{RT} = \frac{y_{i,after} \cdot p_{total,after}V}{RT} = y_{i,after} \cdot p_{total,before} \cdot \frac{y_{N_2,before}}{y_{N_2,after}} \cdot \frac{V}{RT}$$

The mol changes of gas i, which equals the amount of gas produced by the reaction is thus given as:

$$\Delta n_i = n_{i,after} - n_{i,before} =$$

$$y_{i,after} \cdot p_{total,before} \cdot \frac{y_{N_2,before}}{y_{N_2,after}} \cdot \frac{V}{RT} - \frac{y_{i,before} \cdot p_{total,before}V}{RT} \rightarrow \Delta n_i =$$

$$\frac{p_{total,before}V}{RT}\left(y_{i,after} \cdot \frac{y_{N_2,before}}{y_{N_2,after}} - y_{i,before}\right)$$

The yield of $O_2$ is calculated based on the given mole amount of $H_2O_2$:

$$Yield_{O_2} = \frac{\Delta n_{O_2}}{n_{H_2O_2}} = \frac{\Delta n_{O_2}}{0.3 \cdot m_{30\,wt.\%H_2O_2/H_2O} \big/ M_{H_2O_2}} =$$

$$\frac{M_{H_2O_2}}{0.3 \cdot m_{30\,wt.\%H_2O_2/H_2O}} \frac{p_{total,before}V}{RT}\left(y_{i,after} \cdot \frac{y_{N_2,before}}{y_{N_2,after}} - y_{i,before}\right)$$

The yield of CO and $CO_2$ is mass-normalized by the amount of MDPE and can be calculated as:

$$Yield_i = \frac{\Delta m_i}{m_{MDPE}} = \frac{M_i \cdot \Delta n_i}{m_{MDPE}} = \frac{M_i}{m_{MDPE}} \frac{p_{total,before} V}{RT} \left( y_{i,after} \cdot \frac{y_{N_2,before}}{y_{N_2,after}} - y_{i,before} \right)$$

The values of $P_{total,before}$, V, T, and R are given as standard conditions: $P_{total,before}$=1 atm, V=25 ml=0.025 l, R=0.08206 $L \cdot atm \cdot K^{-1} \cdot mol^{-1}$. The amount of MDPE and 30 wt. % $H_2O_2/H_2O$ solution used in the experiments were 1 g each. The molar mass of $H_2O_2$ is 34 g/mol.

TABLE 7

Gas Concentration of different gases before and after each experiment.

| | PE-M [mol %] | | PE-0 [mol %] | | PE-5 [mol %] | | PE-10 [mol %] | |
|---|---|---|---|---|---|---|---|---|
| Component | Before | After | Before | After | Before | After | Before | After |
| $O_2$ | 21.54 ± 0.01 | 21.62 ± 0.07 | 21.67 ± 0.01 | 23.41 ± 0.54 | 21.55 ± 0.01 | 50.36 ± 1.50 | 21.64 ± 0.03 | 57.61 ± 1.83 |
| $N_2$ | 74.19 ± 0.02 | 74.08 ± 0.07 | 74.65 ± 0.01 | 72.75 ± 0.59 | 74.20 ± 0.02 | 43.09 ± 1.59 | 74.45 ± 0.06 | 35.72 ± 1.92 |
| CO | 0 | 0 | 0 | 0 | 0 | 0.001 | 0 | 0.002 ± 0.001 |
| $CO_2$ | 0.040 ± 0.001 | 0.043 ± 0.001 | 0.039 ± 0.001 | 0.047 ± 0.002 | 0.039 ± 0.001 | 0.075 ± 0.002 | 0.042 | 0.071 ± 0.008 |
| $C_xH_y$ | 0 | 0 | 0 | 0 | 0 | 0 | 0 | 0 |
| Water vapor and others | 4.23 ± 0.03 | 4.25 ± 0.01 | 3.65 ± 0.02 | 3.79 ± 0.05 | 4.22 ± 0.03 | 6.47 ± 0.09 | 3.88 ± 0.09 | 6.58 ± 0.08 |

Example 21—Oligomer Extraction Experiment

FIG. 22. illustrates the GC chromatograms as well as the MS spectra of several peaks of the wash solution of polymer. The mass spectra showed a very similar mass fragment pattern across all enumerated peaks of FIG. 22. The same can be observed for other major unlabeled peaks as well. The masses of the most common fragments were indicative of oxygenated species. The peak at m/z=59 is characteristic for fragments containing an alcohol, carboxylic acid or methyl ester group, which could likely come from the antioxidants or the additives that were embedded in the original polymer.

Figure 23:
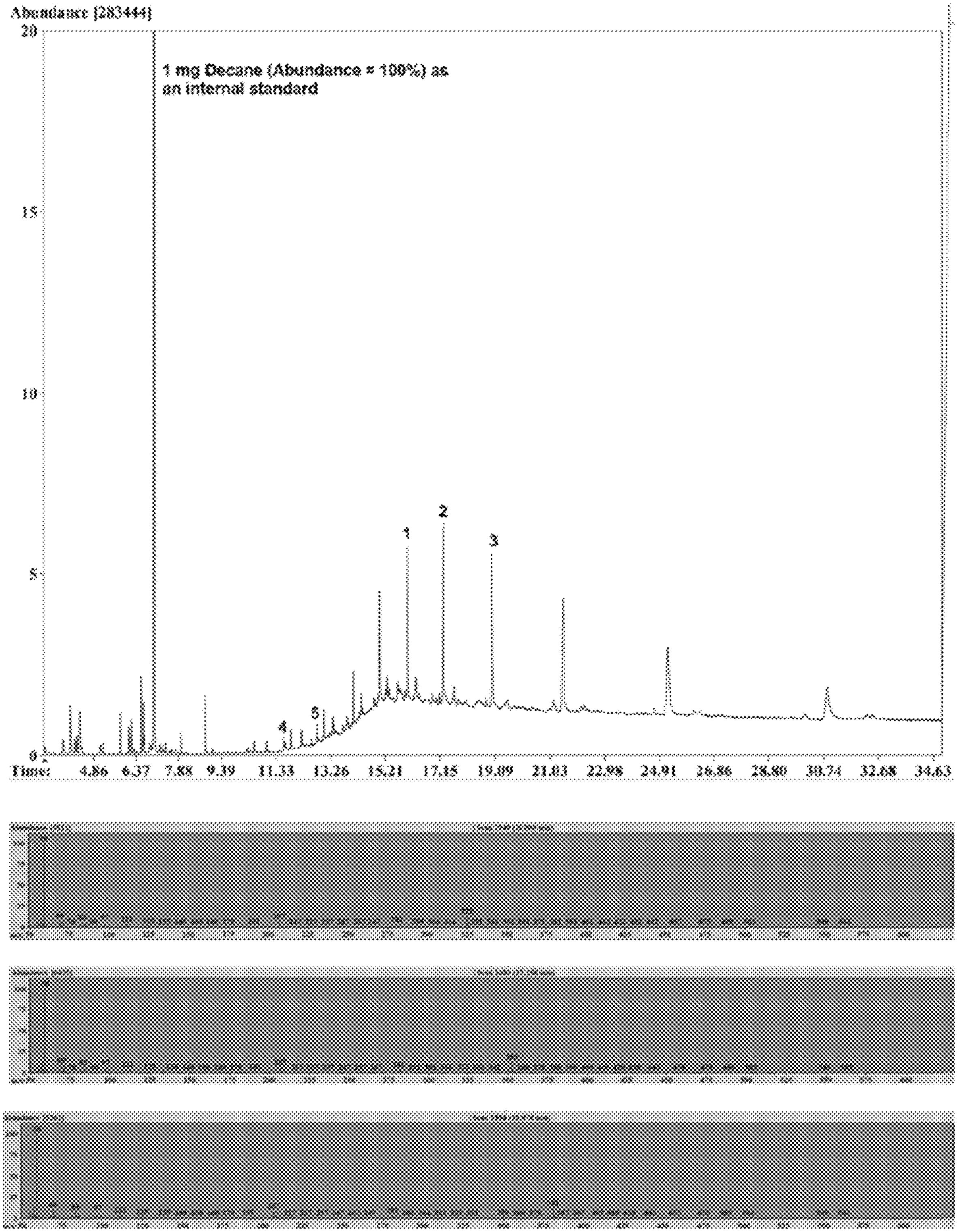
FIG. 23 provides a gas chromatogram of washed solution of depolymerized polymer (top) and mass-spectrometry spectra of peaks 1, 2, and 3, respectively from top to bottom, collected from reaction mixture identified in Table 1 as "PE-10," in accordance with an exemplary embodiment of the present disclosure.

FIG. 23 shows the GC chromatogram as well as the MS spectra of several peaks of the extracted solution from the PE-10 experiment. The same patterns of the major peaks were observed in the gas chromatogram of PE-10 (FIG. 23) compared to the original MDPE polymer (FIG. 22), with the peaks not only having the same elution time and the same mass spectra but also the same intensity as before milling (marked as 1, 2, 3 in FIG. 22). The mass spectra of these peaks are illustrated in FIG. 23, which shows the same spectra as in FIG. 22. This illustrated that these are not the products of the process and most likely to be the additives that were embedded in the original polymer that are soluble in hexane. Several new but smaller peaks were identified (Peak 4, 5) with the corresponding MS Spectra illustrated in FIGS. 24A and 24B.

Figure 24A:
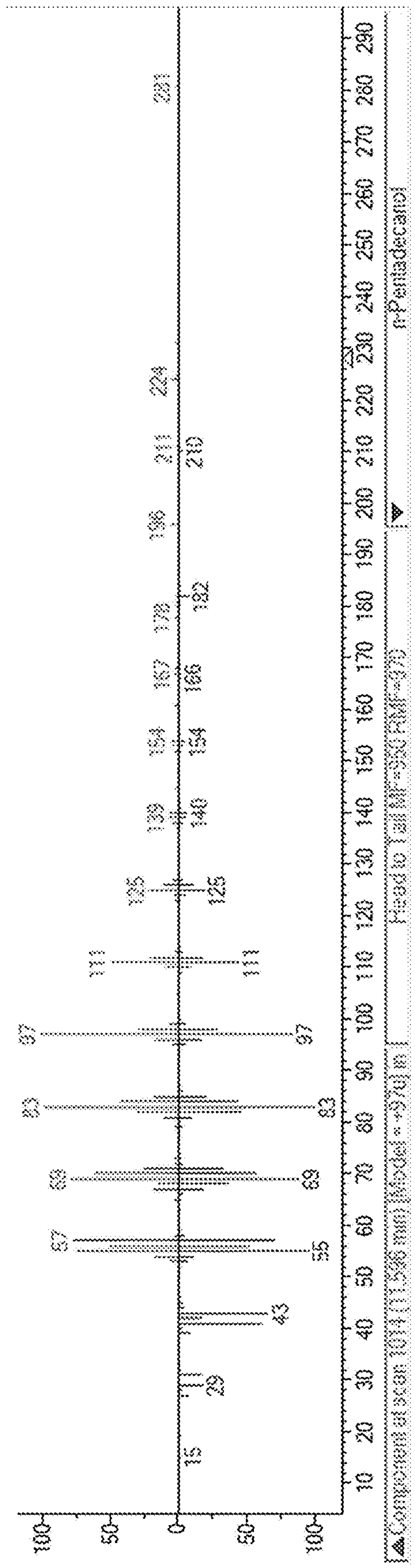
FIGS. 24A and 24B are mass-spectrometry spectra of peaks 4 and 5 of FIG. 23 (top), collected from reaction mixture identified in Table 1 as "PE-10," in accordance with an exemplary embodiment of the present disclosure.
Figure 24B:
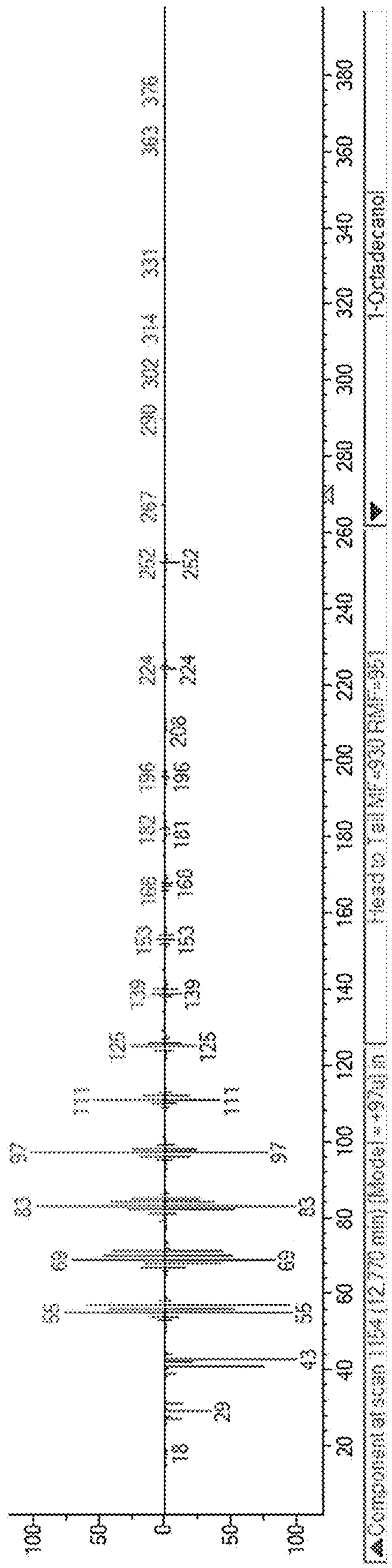

Peak 4 showed a mass spectrum similar to that of a linear primary alcohol, specifically $C_{15}$-alcohol and similarly for Peak 5, the mass spectrum was consistent with a $C_{18}$-alcohol (FIGS. 24A-24B). Based on the GC-MS and the HT-GPC data, the oligomers seem to have the carbon number similar to paraffin wax, and contain some oxygenated species. These oligomer fractions show a very limited solubility in hexane compared to that of the additive. Thus, the efficacy of the extraction method has to be improved in future studies. Overall, these fractions of oligomers could serve as a feed for current petroleum conversion processes, such as catalytic crackers.

It is to be understood that the embodiments and claims disclosed herein are not limited in their application to the details of construction and arrangement of the components set forth in the description and illustrated in the drawings. Rather, the description and the drawings provide examples of the embodiments envisioned. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

Furthermore, the purpose of the foregoing Abstract is to enable the United States Patent and Trademark Office and the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way.

What is claimed is:

1. A method comprising:

forming a reaction mixture by combining polymer feedstock with an activating agent;

producing an oxidized polymer comprising one or more functional groups comprising an oxygen atom; and agitating the oxidized polymer with one or more grinding bodies to produce at least one depolymerized polymer, wherein the agitation is performed without external heating or pressurization.

2. The method of claim 1, wherein the activating agent comprises a reaction product of a catalyst and an oxidizing agent.

3. The method of claim 2, wherein the oxidizing agent comprises at least one of hydrogen peroxide, water, oxygen, hydroxide, ozone, organic peroxides, or combinations thereof.

4. The method of claim 2, wherein the catalyst comprises iron oxide, titanium dioxide, zirconium dioxide, ruthenium oxide, manganese oxide, cerium oxide, molybdenum oxide, vanadium oxide, nickel oxide, cobalt oxide, tungsten carbide, and combinations thereof.

5. The method of claim 1, wherein the grinding bodies comprise balls, rods, or hammers, each comprising inert or chemically reactive materials.

6. The method of claim 1, further comprising:

moving the oxidized polymer through an inert or chemically reactive die to produce a mixture of at least one depolymerized polymer.

7. The method of claim 5, wherein the polymer feedstock comprises a molecular weight equal to or greater than 500 grams per mol (g/mol); and the one or more depolymerized polymers comprise a molecular weight equal to or less than 499 g/mol.

8. The method of claim 1, wherein the polymer feedstock comprises one or more polyolefins.

9. The method of claim 5, further comprising:

collecting the at least one depolymerized polymer; and removing by-products.

10. A method for depolymerizing a polymer product, the method comprising:

oxidizing a polymer feedstock with a reaction product of a catalyst and an oxidizing agent to form an oxidized polymer comprising one or more functional groups comprising an oxygen atom;

milling the oxidized polymer with grinding bodies, wherein the grinding bodies mechanically shear the oxidized polymer; and producing one or more depolymerized polymers comprising a molecular weight less than that of the polymer feedstock.

11. The method of claim 10, wherein the catalyst comprises iron oxide, titanium dioxide, zirconium dioxide, ruthenium oxide, manganese oxide, cerium oxide, molybdenum oxide, vanadium oxide, nickel oxide, cobalt oxide, tungsten carbide, and combinations thereof.

12. The method of claim 10, wherein the oxidizing agent comprises hydrogen peroxide, water, oxygen, hydroxide, ozone, or combinations thereof.

13. The method of claim 10, wherein the polymer product comprises a polyolefin.

14. The method of claim 10, wherein the oxidizing, milling, and producing steps take place in a vessel.

15. A system comprising:

a vessel comprising one or more inert or chemically reactive grinding bodies, polymer feedstock, and an activating agent;

wherein the system is configured to mix the one or more grinding bodies, the polymer feedstock, and an activating agent under approximately ambient temperature and pressure, such that the one or more grinding bodies mechanically impact the polymer feedstock to form at least one depolymerized polymer.

16. The system of claim 15, wherein the vessel comprises an outlet to remove one or more depolymerized polymers or by-products.

17. The system of claim 15, wherein the vessel comprises an inlet for introducing the polymer feedstock, a catalyst, an oxidizing agent, or combinations thereof.

* * * * *